United States Patent
Park et al.

(10) Patent No.: US 10,554,602 B2
(45) Date of Patent: Feb. 4, 2020

(54) USER TERMINAL APPARATUS, SERVER, AND CONTROL METHOD THEREOF

(71) Applicant: SAMSUNG ELECTRONICS CO., LTD., Suwon-si (KR)

(72) Inventors: Gun Park, Suwon-si (KR); Won-suck Lee, Seongnam-si (KR); Ae-young Lee, Seongnam-si (KR); Jung-kih Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 423 days.

(21) Appl. No.: 15/154,383

(22) Filed: May 13, 2016

(65) Prior Publication Data
US 2016/0337291 A1 Nov. 17, 2016

Related U.S. Application Data

(60) Provisional application No. 62/162,136, filed on May 15, 2015.

(30) Foreign Application Priority Data

Sep. 14, 2015 (KR) .................. 10-2015-0129730
May 12, 2016 (KR) .................. 10-2016-0058264

(51) Int. Cl.
*G06F 15/16* (2006.01)
*H04L 12/58* (2006.01)

(52) U.S. Cl.
CPC .............. *H04L 51/14* (2013.01); *H04L 51/04* (2013.01)

(58) Field of Classification Search
CPC ......... H04N 1/00347; H04N 2201/001; H04N 1/32101; H04N 1/00411; H04N 21/4316; H04N 2201/3273; G06F 3/147
See application file for complete search history.

(56) References Cited

U.S. PATENT DOCUMENTS

| | | | |
|---|---|---|---|
| 8,271,595 B2 | 9/2012 | Qureshi et al. | |
| 8,843,825 B1 * | 9/2014 | Whitman .......... | G06F 17/30056 715/730 |

(Continued)

FOREIGN PATENT DOCUMENTS

| | | | |
|---|---|---|---|
| KR | 10-2014-0006731 A | 1/2014 | |
| KR | 10-2014-0072382 A | 6/2014 | |

(Continued)

OTHER PUBLICATIONS

International Search Report dated Aug. 18, 2016, issued by International Searching Authority in counterpart International Application No. PCT/KR2016/005109, (PCT/ISA/210).

(Continued)

*Primary Examiner* — Phuoc H Nguyen
(74) *Attorney, Agent, or Firm* — Sughrue Mion, PLLC

(57) ABSTRACT

A user terminal and a control method thereof are provided. The user terminal includes a communicator configured to communicate with a server; a display configured to display a message screen including a plurality of messages exchanged between the user terminal and the server; and a processor configured to control the display to display the plurality of messages on the message screen in an individually selectable manner, and based on at least one message of the plurality of messages being selected on the message screen and at least one share target, with which to share the at least some of the plurality of messages, being selected, control the communicator to transmit, to the server, information regarding the at least one message of the plurality of messages and the at least one share target.

18 Claims, 40 Drawing Sheets

(56) References Cited

U.S. PATENT DOCUMENTS

| | | | | |
|---|---|---|---|---|
| 2003/0236832 | A1* | 12/2003 | McIntyre | H04L 29/06 |
| | | | | 709/204 |
| 2005/0021624 | A1* | 1/2005 | Herf | H04L 12/1822 |
| | | | | 709/204 |
| 2005/0097173 | A1* | 5/2005 | Johns | G06F 17/3028 |
| | | | | 709/206 |
| 2008/0313256 | A1 | 12/2008 | Kanazawa et al. | |
| 2010/0287053 | A1* | 11/2010 | Ganong | G06F 17/30247 |
| | | | | 705/14.66 |
| 2011/0173256 | A1* | 7/2011 | Khalatian | G06F 3/038 |
| | | | | 709/203 |
| 2013/0159429 | A1 | 6/2013 | Nalliah et al. | |
| 2014/0006525 | A1 | 1/2014 | Freund et al. | |
| 2014/0164948 | A1* | 6/2014 | Joo | G06F 19/321 |
| | | | | 715/752 |
| 2014/0344887 | A1* | 11/2014 | Carter | G06F 21/6245 |
| | | | | 726/1 |
| 2015/0228034 | A1* | 8/2015 | Alderman | G06Q 50/01 |
| | | | | 705/7.32 |

FOREIGN PATENT DOCUMENTS

| | | |
|---|---|---|
| KR | 10-2014-0104967 A | 8/2014 |
| WO | 2013/096025 A1 | 6/2013 |

OTHER PUBLICATIONS

Written Opinion dated Aug. 18, 2016, issued by International Searching Authority in counterpart International Application No. PCT/KR2016/005109, (PCT/ISA/237).

* cited by examiner

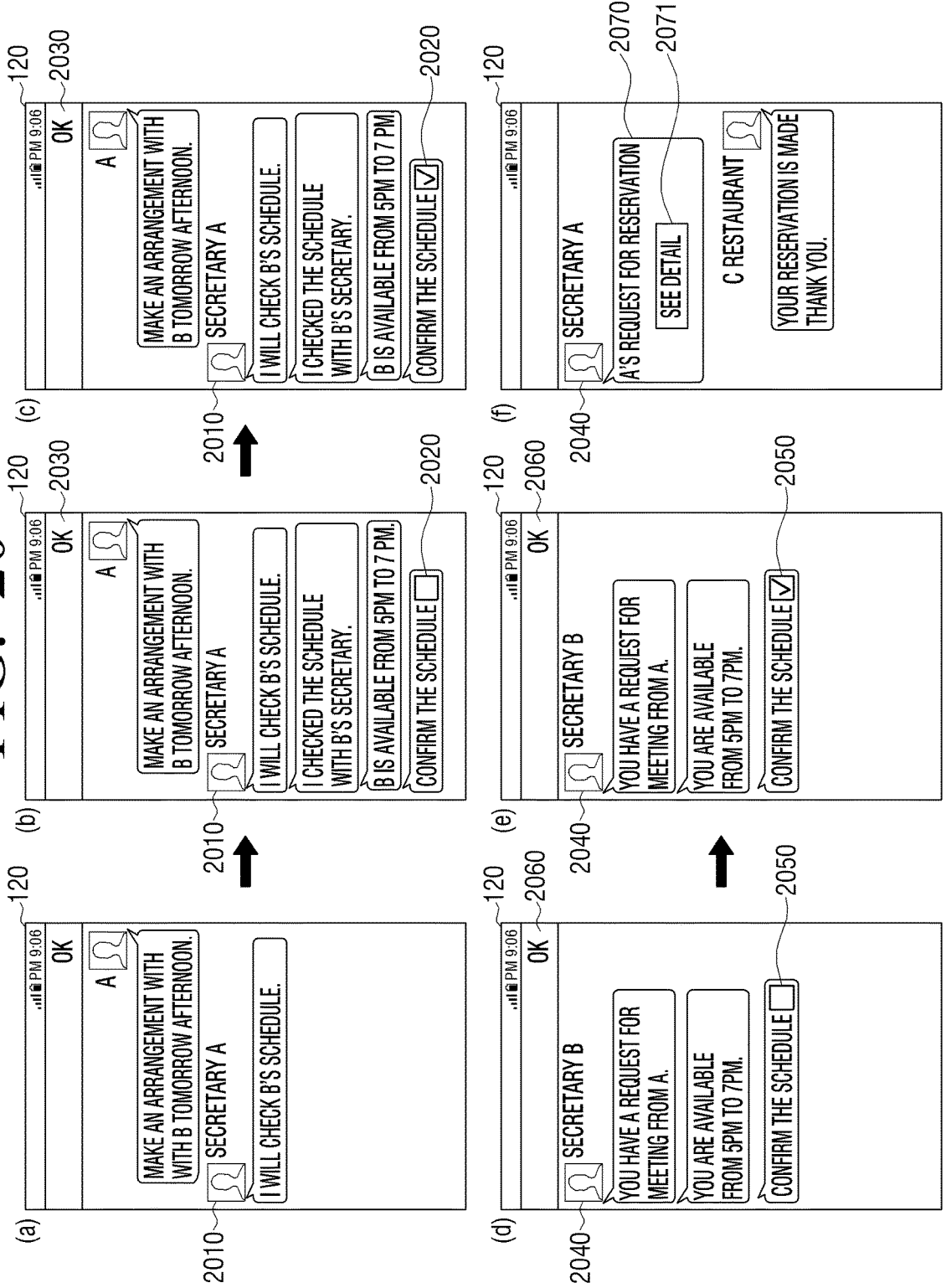

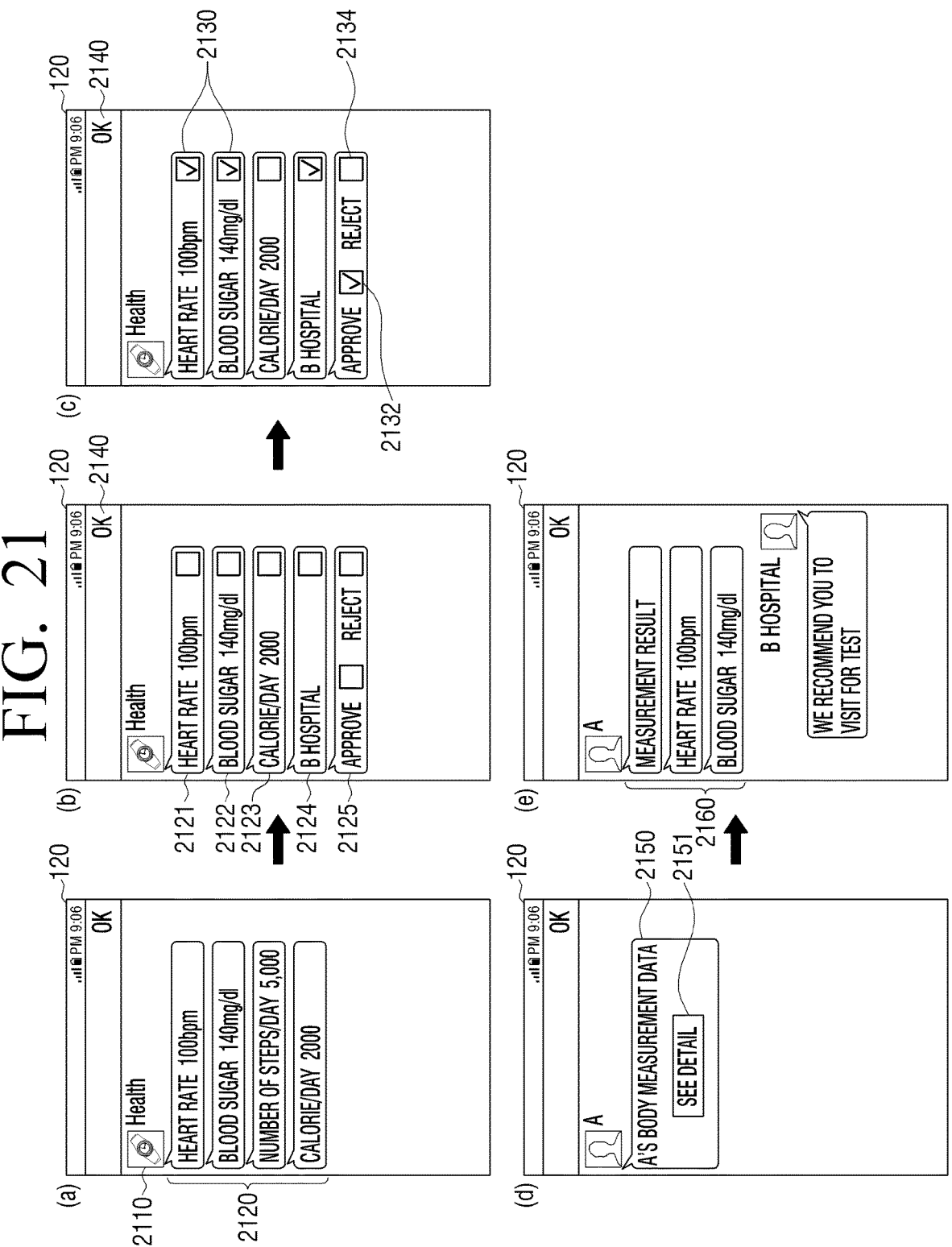

USER TERMINAL APPARATUS, SERVER, AND CONTROL METHOD THEREOF

CROSS-REFERENCE TO RELATED APPLICATIONS

This application claims priority from U.S. Provisional Application No. 62/162,136, filed on May 15, 2015 in the United States Patent and Trademark Office, Korean Patent Application No. 10-2015-0129730, filed on Sep. 14, 2015 in the Korean Intellectual Property Office, and Korean Patent Application No. 10-2016-0058264, filed on May 12, 2016 in the Korean Intellectual Property Office, the disclosures of which are incorporated herein by reference in their entirety.

BACKGROUND

1. Field

Apparatuses and methods consistent with the present disclosure relate to a user terminal apparatus, a server, and a control method thereof, and more particularly, to a user terminal apparatus for selectively sharing content between a plurality of user terminals, a server, and a control method thereof.

2. Description of the Related Art

Due to the wide adoption of smartphones and advancements in information and communication technology, instant messaging applications, such as a mobile messenger, and social networking services (SNS) have grown in popularity. Accordingly, the number of users of these applications and services has increased dramatically. Users can use mobile messengers and social media sites to not only carry out private conversations but also to share various content with other users, such as news, posts, links, and the like.

However, it is often difficult and cumbersome to share information using these applications and services due to their lack of a streamed interface suited for sharing multiple items of content. For example, in order for one user to share multiple posts or messages, originally composed by another user, with yet another user, the user wishing to share the multiple posts or messages have to perform a complicated series of steps, such as selecting the messages one by one and forwarding each of the messages one at a time.

Furthermore, a message received from other users, such as a message including photos, videos, etc., may be freely forwarded to a third party irrespective of the original sender's intent or wishes. Thus, allowing users to propagate other users' messages without any limitations may pose a security threat especially when the exchanged messages are of sensitive nature.

Accordingly, a better way of conveniently and securely sharing messages exchanged between users is needed.

SUMMARY

Exemplary embodiments overcome the above disadvantages and other disadvantages not described above. Also, the present disclosure is not required to overcome the disadvantages described above, and an exemplary embodiment may not overcome any of the problems described above.

Exemplary embodiments provide a user terminal apparatus for more conveniently sharing a message, transmitted to and received from another user terminal apparatus, with a third party while minimizing a security issue. A server and a control method thereof are also provided.

According to an aspect of an exemplary embodiment, there is provided a user terminal including a communicator configured to communicate with a server; a display configured to display a message screen including a plurality of messages exchanged between the user terminal and the server; and a processor configured to control the display to display the plurality of messages on the message screen in an individually selectable manner, and based on at least one message of the plurality of messages being selected on the message screen and at least one share target, with which to share the at least some of the plurality of messages, being selected, control the communicator to transmit, to the server, information regarding the at least one message of the plurality of messages and the at least one share target.

The processor may be further configured to control the display to display a menu window for selecting a share option. The menu window may include a first option for manually selecting the plurality of messages. The processor may be further configured to, in response to the first option being selected on the menu window, control the display to display the plurality of messages on the message screen in an individual selection mode, in which each of the plurality of messages is selectable by a user for sharing with the at least one share target.

The menu window may further include a second option for selecting a group of messages, and the processor may be further configured to, based on the second option being selected on the menu window, control the display to display the plurality of messages on the message screen in a group selection mode, in which each of the plurality of messages are selectable by the user for sharing with the at least one share target and if two messages are selected by the user, intervening messages between the two messages selected by the user are automatically selected for sharing with the at least one share target.

The menu window may further include a third option for selecting the at least one share target, and the processor may be further configured to, based on the third option being selected on the menu window, control the display to display a list of previously stored user terminals, and, based on at least one of the user terminals being selected from the list, designate the selected user terminal as the at least one share target.

The processor may be further configured to control the display to display a menu window for selecting a share option, and the share option may include a first option for manually selecting a message, a second option for selecting a group of messages, a third option for selecting the at least one share target, a fourth option for providing a uniform resource locator (URL) of a landing page including a shared message, a fifth option for setting a share time limit of the shared message, and a sixth option for setting an access count limit for the shared message, and the access count limit may indicate a number of times that the at least one share target is permitted to access the shared message.

The processor may be further configured to, based on a notification message with respect to a second plurality of messages selected by a second user terminal being received via the communicator, control the display to display the notification message, and, based on the notification message being activated by a user, control the display to display a share message screen linked to the notification message, and the share message screen may include the second plurality of messages selected by the second user terminal.

The processor may be further configured to, based on a share approval request being received from the server, control the display to display a share approval screen corresponding to the share approval request. The share approval screen may include a selection menu for selecting whether to approve or reject the share approval request. The processor may be further configured to control the communicator to transmit, to the server, a control signal corresponding to a selection by a user with respect to the share approval screen.

The message screen may be a chatroom of a messaging application being executed on the user terminal. The chatroom may sequentially display the plurality of messages that are input by a plurality of user terminals participating in the chatroom. Based on at least one of the plurality of messages displayed on the chatroom being selected for sharing, the communicator may transmit a share approval request to the plurality of user terminals participating in the chatroom.

According to an aspect of another exemplary embodiment, there is provided a server including a communicator configured to communicate with a plurality of user terminals; and a processor configured to, based on the communicator receiving, from a first user terminal, a share request with respect to a plurality of messages originating from a second user terminal, generate a share message screen that combines the plurality of messages, generate a notification message including a link to the share message screen, and transmit the notification message to a third user terminal designated by the share request as a share target.

The processor may be further configured to transmit, to the second user terminal, a share approval request with respect to the plurality of messages, and the server may allow the first user terminal to share the plurality of messages with the third user terminal only if the second user terminal accepts the share approval request.

According to an aspect of another exemplary embodiment, there is provided a method performed by a user terminal apparatus including displaying, by a first user terminal, a message screen including a plurality of messages received from a second user terminal via a server; displaying the plurality of messages on the message screen in an individually selectable manner; and based on at least some of the plurality of messages being selected on the message screen, and a third user terminal, with which to share the at least some of the plurality of messages, being selected, information regarding the at least some of the plurality of messages and the third user terminal may be transmitted to the server.

The method may further include displaying a menu window for selecting a share option, and the menu window may include a first option for manually selecting the plurality of messages. Based on the first option being selected on the menu window, the plurality of messages may be displayed on the message screen in an individual selection mode, in which one or more of the plurality of messages may be manually selected by a user for sharing with the third user terminal.

The menu window may further include a second option for selecting a group of messages, and the method may further include, based on the second option being selected on the menu window, the plurality of messages may be displayed on the message screen in a group selection mode, in which intervening messages between two messages selected by the user are automatically selected for sharing with the third user terminal.

The menu window may further include a third option for selecting the third user terminal, and the method may further include, based on the third option being selected on the menu window, a list of previously stored user terminals may be displayed; and based on at least one of the user terminals being selected from the list, the selected user terminal may be designated as the third user terminal.

The method may further include displaying a menu window for selecting a share option, and the share option may include a first option for manually selecting a message, a second option for selecting a group of messages, a third option for selecting the third user terminal, a fourth option for providing a uniform resource locator (URL) of a landing page including a shared message, a fifth option for setting a share time limit of the shared message, or a sixth option for setting an access count limit for the shared message, and the access count limit may indicate a number of times that the third user terminal is permitted to access the shared message.

The method may further include: based on a notification message with respect to a second plurality of messages selected by a second user terminal being received, the notification message may be displayed. In response to the notification message being activated by a user, a share message screen linked to the notification message may be displayed. The share message screen may include the second plurality of messages selected by the second user terminal.

The method may further include: based on a share approval request being received from the server, a share approval screen corresponding to the share approval request may be displayed, wherein the share approval screen may include a selection menu for selecting whether to approve or reject the share approval request; and transmitting a control signal corresponding to a selection by a user with respect to the share approval screen may be transmitted to the server.

The message screen may be a chatroom of a messaging application being executed on the first user terminal. The chatroom may sequentially display the plurality of messages that are input by a plurality of user terminals participating in the chatroom. The transmitting the information to the server may include at least one of the plurality of messages displayed on the chatroom being selected for sharing, a share approval request may be transmitted to the plurality of user terminals participating in the chatroom.

According to an aspect of another exemplary embodiment, a method performed by a server includes receiving, by a server and from a first user terminal, a share request with respect to a plurality of messages originating from a second user terminal, generating a share message screen that combines the plurality of messages; generating a notification message including a link to the share message screen; and transmitting the notification message to a third user terminal designated by the share request as a share target.

The method may further include: transmitting, to the second user terminal, a share approval request with respect to the plurality of messages, wherein the server allows the first user terminal to share the plurality of messages with the third user terminal only if the second user terminal accepts the share approval request.

According to an aspect of another exemplary embodiment, there is provided a non-transitory computer-readable storage medium storing instructions which, when executed by a processor, may cause the processor to perform a method including displaying, by a first terminal, a plurality of messages received form a second terminal via a server, receiving, from a user of the first terminal, a first selection of a first message of the plurality of messages, receiving, from the user, a second selection of a second message of the plurality of messages, receiving, from the user, a share target selection of a third terminal, and transmitting, to the server, a share request for sharing, with the third terminal, the first message, the second message, and all intervening messages of the plurality of messages between the first message and the second message.

The plurality of messages may be displayed on a messaging application executing on the first terminal. The plurality of messages may be displayed on a social media service being rendered on the first terminal.

A share time limit associated with the sharing and an access count limit associated with the sharing may also be received from the user. The access count limit may indicate a number of times that the third terminal is permitted to access the shared messages. The share time limit and the access count limit may be included in the share request prior to transmitting the share request to the server.

According to an aspect of another exemplary embodiment, there is provided a server including a processor and a computer-readable storage medium storing instructions which, when executed by the processor, cause the processor to perform operations including: receiving, from a first terminal, a share request including a plurality of shared messages and an identity of a third terminal as a share target, the plurality of shared messages originating from a second terminal; transmitting a notification message to the third terminal, the notification message including a link to a landing page; transmitting a share approval request to the second terminal; and upon receiving an approval message from the second terminal in response to the share approval request, populating the landing page with the plurality of shared messages.

Upon receiving a rejection message from the second terminal in response to the share approval request, the landing page may be populated with redacted versions of the plurality of shared messages.

According to an aspect of another exemplary embodiment, there is provided a user terminal including a communicator, a display, and a processor. The communicators may be configured to communicate with a server. The display may be configured to display a messaging application including a plurality of messages exchanged between the user terminal and the server. The processor may be configured to control the display to display a plurality of selectors respectively corresponding to the plurality of messages. Each of the plurality of selectors may indicate a selection status of a corresponding message of the plurality of messages. The processor may be further configured to, when the plurality of selectors are selected on the messaging application by the user and at least one share target, with which to share the plurality of messages, is selected on the messaging application by the user, control the communicator to transmit, to the server, information regarding the plurality of messages and the at least one share target.

BRIEF DESCRIPTION OF DRAWINGS

The above and/or other aspects will be more apparent by describing certain exemplary embodiments with reference to the accompanying drawings, in which:

FIG. 20 illustrates a process of transmitting a plurality of messages between a user terminal apparatus and an artificial intelligence server apparatus to another user terminal apparatus, according to an exemplary embodiment; and FIG. 21 illustrates a process of transmitting a plurality of messages between a user terminal apparatus and a healthcare wearable device to another user terminal apparatus, according to an exemplary embodiment.

DETAILED DESCRIPTION OF EXEMPLARY EMBODIMENTS

Figure 1:
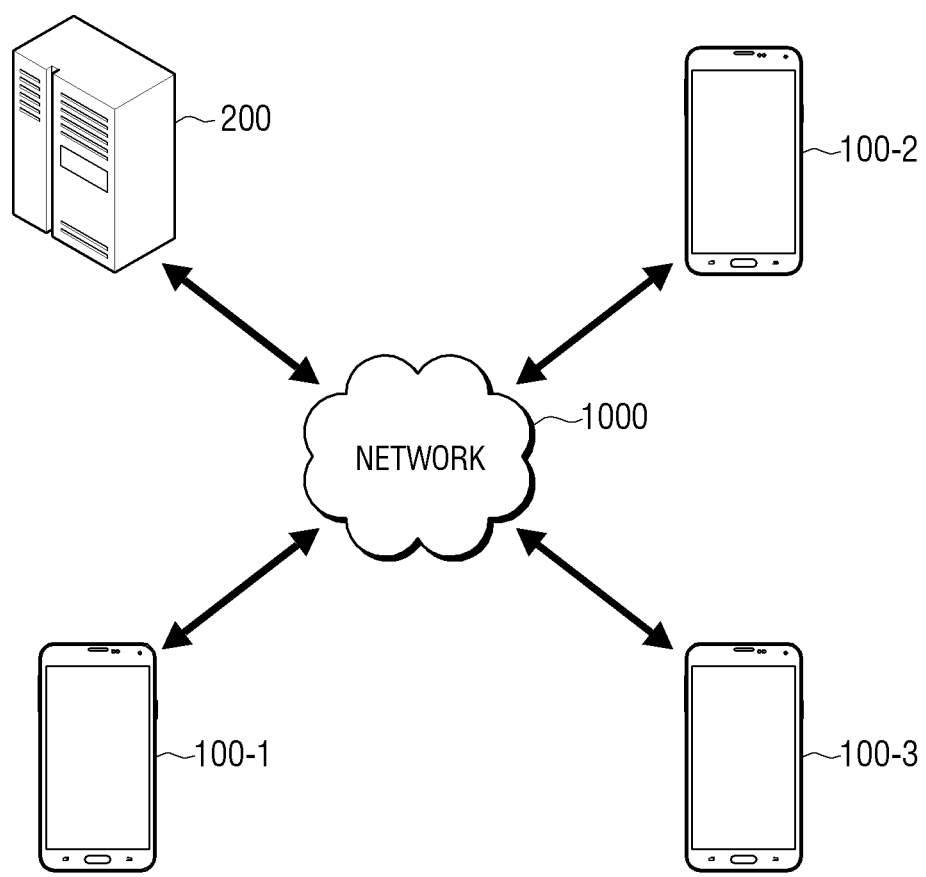
FIG. 1 is a diagram of a system including a plurality of user terminals and a server, according to an exemplary embodiment.

The exemplary embodiments may be modified in various ways. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, detailed descriptions of well-known functions or constructions may be omitted.

The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. Moreover, it should be understood that features or configurations herein with reference to one embodiment or example can be implemented in, or combined with, other embodiments or examples herein. That is, terms such as "embodiment," "variation," "aspect," "example," "configuration," "implementation," "case," and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

FIG. 1 is a diagram of a system including a plurality of user terminal apparatuses ("user terminals") 100-1-100-3 (collectively "user terminals 100") and a server 200, according to an exemplary embodiment.

Referring to FIG. 1, the system according to an exemplary embodiment may include the plurality of user terminals 100 and the server 200.

A network 1000 may relay signals that are transmitted and received between the server 200 and the plurality of user terminals. According to an exemplary embodiment, the network 1000 may include a mobile communication network, a wireless communication network, a wired communication network, a local area network (LAN), a wide area network (WAN) such as the Internet, and a short distance communication network such as Bluetooth, Zigbee, Wi-Fi, etc. However, the network 1000 is not limited to the above-described embodiment.

The user terminal apparatuses or user terminals 100 may include an input interface for inputting a message by a user. The input interface may include a keyboard, a keypad, a touch panel, a stylus, a microphone, a gesture sensor, and the like. For example, a desktop computer may allow the user to input the message by using a keyboard, and a smartphone may allow the user to input the message by using a touch panel.

In this regard, an input message may refer to various types of digital content including text, audio, images, and moving images composed by a human user. For example, the user may transmit images or moving images stored in a first user terminal 100-1 in the form of a page to a second user terminal 10-2 and a third user terminal 100-3.

The first user terminal 100-1 may display the message input by the user and transmit the input message to the second user terminal 100-2 and the third user terminal 100-3 via the network 1000 and the server 200. The first user terminal 100-1 may display the input message received from the second user terminal 100-2 and/or the third user terminal 100-3 via the server 200. That is, the message exchanged between the plurality of user terminals 100 may be relayed via the server 200. Therefore, the first user terminal 100-1 may select a message to be shared, select another user terminal or user as a message share target, and transmit to the server 200 information regarding the selected message and the share target. The first user terminal 100-1 may also select a message received from the second user terminal 100-2, and transfer the message to the third user terminal 100-3.

The user terminals 100 may be electronic devices having a communications functionality. For example, the user terminals 100 may include a phone, a smart phone, a tablet personal computer (PC), a mobile device, an video conferencing phone, an e-book reader, a desktop computer, a laptop computer, a netbook computer, a personal digital assistant (PDA), a portable multimedia player (PMP), a portable audio player, a mobile medical device, a navigation system, a camera, a wearable device, a television, a set-top box, an appliance, etc. The wearable device may include a head-mounted display (HMD), electronic glasses, electronic clothes, an electronic bracelet, a digital accessory, a smart watch, etc.

However, the user terminals 100 may be any apparatuses or devices that include input and output apparatuses and are capable of communicating with the server 200. For example, the user terminals 100 may include smart home appliances having a communications functionality, such as a television, a digital versatile disc (DVD) player, an audio player, a refrigerator, an air conditioner, etc. However, it will be readily understood by one of ordinary skill in the art that the user terminals 100 according to the present disclosure are not limited to the above-described devices.

The server 200 may provide a service to transmit messages to and receive messages from the plurality of user terminals 100. The server 200 may perform a relay function by receiving a message (text) input by a user via the user's terminal and transmitting the message to the target user terminal.

The server 200 may detect presence information of a target user terminal to which a communication is requested when the communication request is sent from one of the terminals 100. The server 200 may generate a communications channel between two or more of the user terminals 100, and provide messaging service. For example, if the communications channel between the first user terminal 100-1 and the second user terminal 100-2 is generated, messages transmitted from the first user terminal 100-1 may be transmitted to the second user terminal 100-2 via the server 200, and vice versa.

The server 200 may store a message being exchanged between two or more user terminals. For example, the server 200 may store a conversation that includes two or more messages exchanged between user terminals in chronological order. The server 200 may provide previously stored conversations according to a previous conversation request from a user terminal.

The server 200 may also group together some of the plurality of user terminals 100 into a group or a subgroup. A message from one user terminal in the group may be transmitted to other user terminals belonging in the same group. In this regard, each of the plurality of user terminals 100 may confirm the received message.

The server 200 may include one or more modules for performing the various functions described above in order to utilize a virtual router technology or general-purpose computing on graphics processing units (GPGPU) for a networking service accompanied by sharing files in a message format, along with providing a message transmission service.

Figure 2:
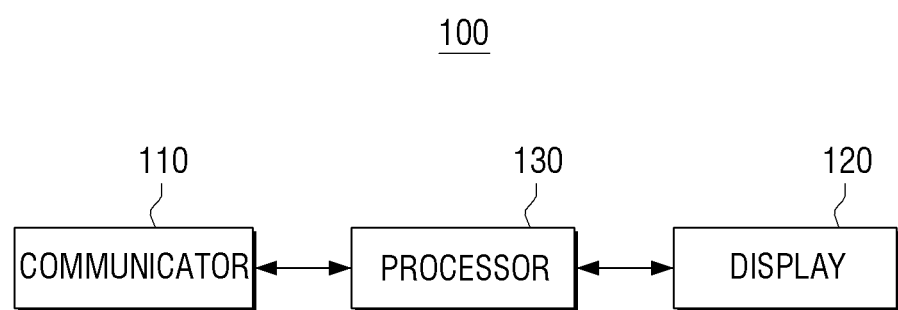
FIG. 2 is a block diagram of a configuration of a user terminal, according to an exemplary embodiment.

FIG. 2 is a block diagram of a simplified configuration of a user terminal 100, according to an exemplary embodiment.

Referring to FIG. 2, the user terminal 100, according to an exemplary embodiment, may include a communicator 110, a display 120, and a processor 130.

The communicator 110 may be an element that communicates or interfaces with various external apparatuses according to various types of communication methods and protocols. For example, an external apparatus may include other user terminals and the server 200 that provides messaging service.

The communicator 110 may be connected to the server 200 via mobile communication by using at least one antenna under the control of the processor 130. The communicator 110 may include a wireless LAN module and/or a short distance communication module. The wireless LAN module may, under the control of the processor 130, connect to the Internet via a wireless access point (AP). The wireless LAN module may support the wireless LAN standard (e.g., IEEE 802.11x) of the Institute of Electrical and Electronics Engineers (IEEE). The short distance communication module may wirelessly perform short distance communication with another user terminal located in a relatively short distance under the control of the processor 130. A short distance communication protocol may include Bluetooth, infrared data association (IrDA), near field communication (NFC), etc. The communicator 110 may, under the control of the processor 130, access the server 200 to transmit and receive a message or receive conversation content stored in the server 200.

To this end, the communicator 110 may include a Wi-Fi chip, a Bluetooth chip, a wireless communication chip, an NFC chip, etc. The processor 130 may communicate with the server 200 or other user terminals by using the communicator 110.

In particular, the Wi-Fi chip and the Bluetooth chip may perform communication by using Wi-Fi and Bluetooth, respectively. In a case where the Wi-Fi chip or the Bluetooth chip is used, the Wi-Fi chip or the Bluetooth chip may first transmit and receive various types of connection information including a service set identifier (SSID), a session key, or the like, establish a connection for communication by using the connection information, and then transmit and receive various types of information using the established connection. The wireless communication chip may mean a chip or integrated circuit that performs communication according to various communication standards and protocols, such as the IEEE, ZigBee, third generation (3G), 3rd Generation Partnership Project (3GPP), Long Term Evolution (LTE), or the like. The NFC chip may mean a chip or integrated circuit that operates by using a 13.56 MHz band from among various radio-frequency identification (RFID) frequency bands such as 135 kHz, 13.56 MHz, 433 MHz, 860-960 MHz, 2.45 GHz, or the like.

The display 120 may present various types of visual content to the user by displaying the content on a screen. In this regard, the visual content may include an application executing on the user terminal; various messages, such as text, images, moving images, etc.; a graphic user interface (GUI); etc. In the present disclosure, the display 120 may display a message received from or transmitted to the server 200.

The display 120 may be implemented, but not limited thereto, as various types of display devices such as a liquid crystal display (LCD), an organic light emitting diode (OLED) display, an active-matrix organic light-emitting diode (AMOLED) display, a plasma display panel (PDP) display, etc. The display 120 may include an additional element based on the type of display device being used. For example, in a case where the display 120 is an LCD display, the display 120 may include an LCD display panel, a backlight supplying light to the LCD display panel, and a panel driving substrate driving the LCD display panel.

The display 120 may be implemented as a touchscreen for receiving various touch or gesture inputs through a user's body (e.g., fingers including a thumb and an index finger) or a stylus. The touchscreen may be implemented as a resistive touchscreen, a capacitive touchscreen, an infrared touchscreen, an ultrasound touchscreen, etc.

The processor 130 may control the general operations of the user terminal 100. For example, if a share menu is selected on a message screen, the processor 130 may control the display 120 to display the messages on the message screen in an individual selection mode. A user may select a plurality of messages on the message screen. In particular, the user may select only those messages, among the plurality of messages, that the user wishes to share with another user, and, if at least one share target with which to share the selected message is selected, the user terminal may inform the server 200 of the selected message and the share target.

The share menu may include an option on the message screen of directly selecting a message that is to be shared with another user terminal, an option of selecting the share target to share the message with, or an option of setting a limitation with respect to the message that is to be shared, such as a share period, a number of times the message may be accessed, etc.

Likewise, the processor 130 may receive a notification message with respect to a plurality of messages selected by another user terminal via the communicator 110. In this regard, a process of selecting the plurality of messages in another user terminal may be the same as a process of selecting the message by using the above-described share menu. If the processor 130 receives a notification message, the processor 130 may display the received notification message. In this regard, if the user selects the notification message, the processor 130 may control the display 120 to display a share message screen linked to the notification message. In this regard, the linked share message screen may include a uniform resource locator (URL) linked to the plurality of messages selected by another user terminal. The share message screen may sequentially display the plurality of messages selected by another user terminal or display the plurality of messages in a list.

The processor 130 may receive a share approval request from the server 200 and control the display 120 to display the share approval screen including a selection menu regarding the approval. In particular, if a user of the user terminal 100 were to access shared content that was authored or uploaded by a user other than the user who shared the content, the processor 130 may receive the share approval request from the user who authored or uploaded the content. In this regard, a message screen through which a message is transmitted and received to and from another user may be generated. The share approval request may be accepted or rejected on the generated message screen. If the share approval request is rejected, a third party may not be permitted to access the corresponding content. In particular, the processor 130 may transmit a control signal corresponding to a selection by the user with respect to the share approval screen to the server 200. If the share approval request is accepted, the server 200 may provide authorization to access the corresponding content for the third party and transmit the corresponding content to a terminal of the third party. On the contrary, if the share approval request is rejected, the server 200 may not provide approval of accessing the corresponding content to the third party and withhold transmission of the corresponding content to the terminal of the third party.

An embodiment in which the user terminal 100 selects the plurality of messages that are to be shared with another user terminal, an embodiment in which the user terminal 100 receives the shared message from another user terminal, and an embodiment in which the user terminal 100 accepts or rejects the share approval request will be described in detail below.

Figure 3:
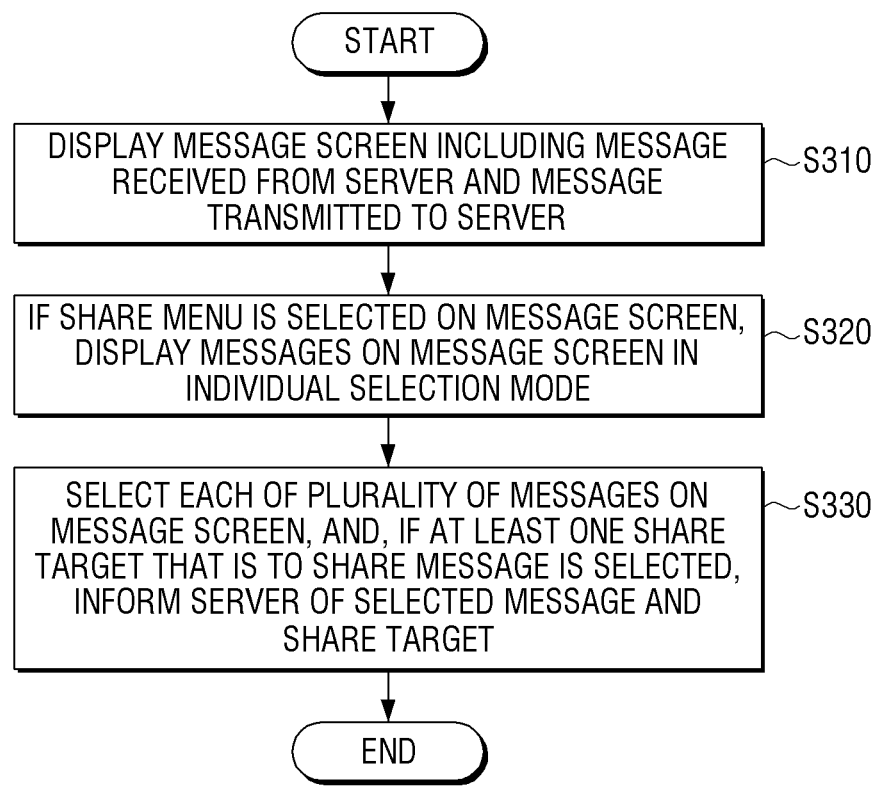
FIG. 3 is a flowchart of a method performed by a user terminal for sharing a plurality of messages with another user terminal, according to an exemplary embodiment.

FIG. 3 is a flowchart of a method performed by a user terminal for sharing a plurality of messages with another user terminal, according to an exemplary embodiment.

First, a message screen including a message received from the server 200 and a message transmitted to the server 200 may be displayed (S310). In this regard, the message screen may include a conversation screen of a commercial messenger application such as KakaoTalk, Line, WhatsApp, or a timeline screen of a social networking service (SNS), such as Facebook, Twitter, Google+, etc. The message of the messenger application may be a message that includes various pieces of content such as text, images, moving images, audio, video, etc. transmitted and received by a user. The message of the SNS may be various pieces of content such as text, images, moving images, audio, video, etc. published or posted by a user on the SNS.

Thereafter, if a share menu is selected on the message screen, messages may be displayed on the message screen in individual selection mode (S320). The share menu may be displayed when an icon displayed on the message screen is selected by using touch, etc. The user may select and determine options such as a method of selecting a message that is to be shared from the share menu, a share target with which to share the message, a limitation setting with respect to sharing of the message, etc.

The user may use an individual selection mode, which allows the user to manually select individual messages that are to be shared or use a group selection mode, which allows the user to automatically select all intervening messages between two messages selected by the user.

If the user uses the individual selection mode, a selection icon may be displayed on the message screen for selecting messages. In particular, a plurality of selectors may be displayed in the form of icons, check boxes, or toggles for respective messages. The user may interact with one of the selection icons and select the messages that are to be shared. If the user interacts with a selection icon (e.g., by touch), a message corresponding to the selection icon may be selected, and the selection icon of the selected message may be displayed differently from a selection icon of a non-selected message. However, the selection icon may not be separately displayed, but each message may be selected using a method in which the user touches a region that displays the message. In this regard, a color of the selected message may be different from a color of the non-selected message so that the selected message and the non-selected message may be distinguished from each other.

Alternatively, when the user selects the share menu on the message screen, instead of displaying the share menu, the system may display the messages in the individual selection mode.

Thereafter, each of the plurality of messages may be selected on the message screen, and, if at least one share target share the message with is selected, the selected messages and the share targets may be informed to the server 200 (S330). In this regard, the user terminal 100 may be logged in with an account registered in the server 200. The user may select another user terminal associated with another account registered in the server 200 as the share target. In particular, if the user selects a share target selection option from a menu window on which a share option may be selected, the user terminal 100 may display a list of previously stored user terminals. If at least one other user terminal is selected from the list, the selected user terminal may be designated as the share target.

However, the order in which the selection of the plurality of messages and the selection of the share target are performed may be reversed. In other words, the user may select the plurality of messages first and then select the share target, or select the share target first and then select the plurality of messages. Once the plurality of messages and the share target are selected, information regarding the selected messages and the shared target may be transmitted to the server 200.

FIGS. 4A through 4E are diagrams showing a process of sharing a plurality of messages with another user terminal, according to an exemplary embodiment.

Figure 4A:
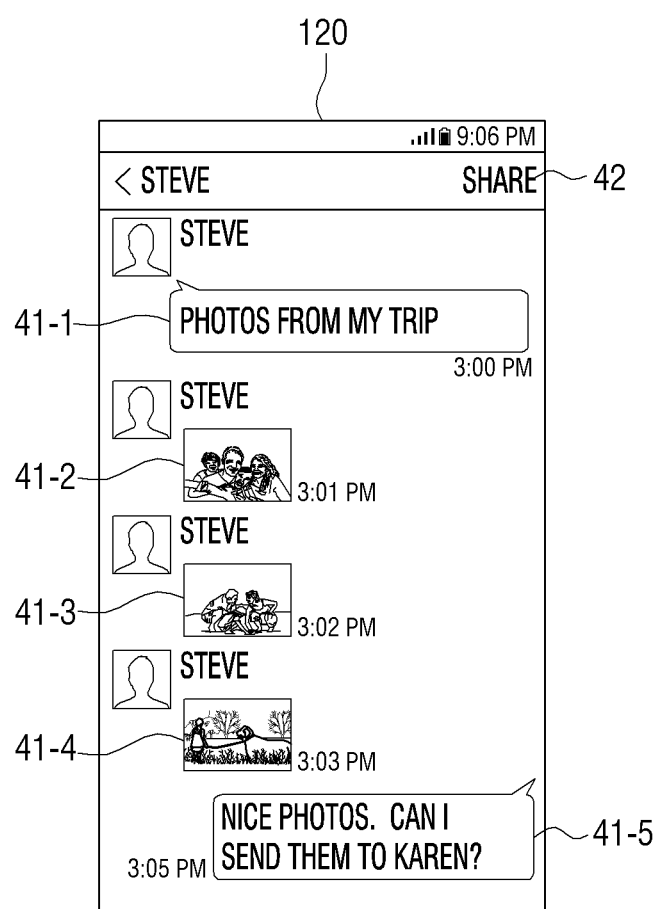
FIGS. 4A through 4E are diagrams showing a process of sharing a plurality of messages with another user terminal, according to an exemplary embodiment.

FIG. 4A shows a conversation screen of a messenger application executed by the user terminal 100, according to an exemplary embodiment. As shown in FIG. 4A, the user terminal 100 may sequentially display a plurality of messages 41-1-41-4 (collectively "41") received from "Steve," who is a user of another user terminal. In this example, the messages 41 may include various types of content including text, images, photos, audio, video, etc. The processor 130 may display a menu window 43 on which a share option of a message may be selected when the user activates a share command, for example, by selecting a share icon 42 displayed on a menu bar at the top of the conversation screen.

Figure 4B:
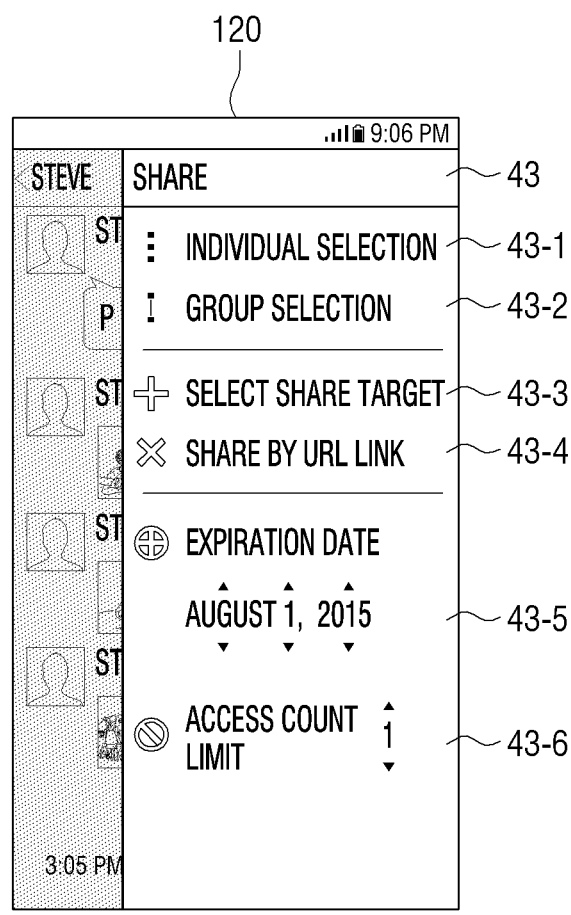

FIG. 4B shows a conversation screen with a menu window 43 on which share options may be selected in the user terminal apparatus 100, according to an exemplary embodiment.

As shown in FIG. 4B, the share options that may be selected from the menu window 43 may include a first option 43-1 for individually selecting messages, a second option 43-2 for selecting messages in a group, a third option 43-3 for selecting a share target, a fourth option 43-4 for providing an URL of a landing page including shared messages, a fifth option 43-5 for setting a time limit for the shared messages, and a sixth option 43-6 for setting an access count limit (i.e., a number of times the shared messages may be accessed).

The first option 43-1 and the second option 43-2 may be options for choosing a message selection method. The first option 43-1 may be an option for allowing the user to manually select one or more messages to share. If the first option 43-1 is selected from the menu window 43, the processor 130 may control the display 120 to display each message on the message screen in an individual selection mode.

Figure 4C:
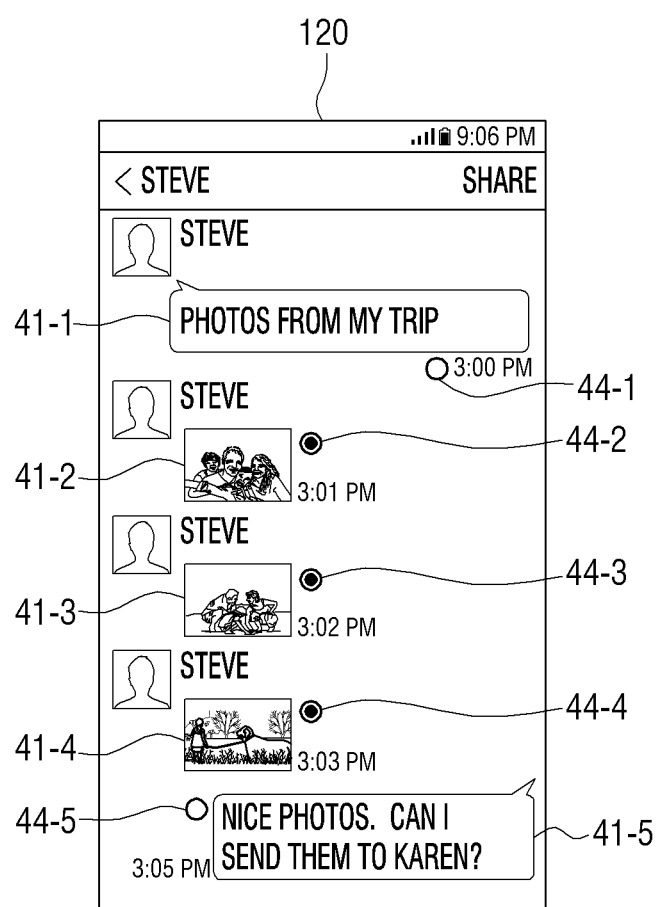

FIG. 4C shows an exemplary embodiment in which messages are displayed on a message screen in an individual selection mode.

As shown in FIG. 4C, if the first option 43-1 is selected, selectors 44-1-44-5 (collectively "44") for selecting one or more of the messages 41 of the message screen may be respectively generated and displayed for the messages 41. Each of the selectors 44 may indicate a selection status (i.e., "selected" or "unselected") of a corresponding message from among the messages 41. As shown in FIG. 4C, for example, the user has selected the messages 41-2, 41-3, and 41-4, as indicated by their respective selectors 44-2, 44-3, and 44-4, but the messages 41-1 and 44-5 remain unselected, as indicated by their respective selectors 44-1 and 44-5. The selectors 44 may be check boxes, toggles, radio buttons, etc. Alternatively, the messages 41 may be displayed differently (e.g., highlighted) to indicate their individual selection statuses. The user may select from the displayed messages 41 only those messages 41-2, 41-3, 41-4 that are to be shared with another user terminal.

The second option 43-2 may be an option for selecting a group of messages. The group of messages may be selected in relation to a time period. If the second option 43-2 is selected from the menu window 43 and the user selects two messages from among the messages 41 arranged in chronological order while the message screen is in the individual selection mode, the processor 130 may control the display 120 to select the two user-selected messages and all intervening messages between the two user-selected messages. For example, the processor 130 may automatically select the message 41-3 that was sent between the two messages 41-2 and 41-4 in a case where the user selects two messages 41-2 and 41-4. Other methods of selecting a group of messages may be also used. For example, the user may select a first message, and then drag or swipe across the screen towards a second message to make additional message selections. In another example, the user may input the start date/time and the end date/time to specify a time period, and then any messages exchanged during that time period may be automatically selected.

Meanwhile, it will be obvious to one of ordinary skill in the art that a message that is selected from the message screen may not be limited to a currently displayed message, and additional messages that show up when the message screen is scrolled up, down, left, or right may also be selected.

The third option 43-3 may be an option for selecting one or more other user terminals to share the selected messages with. If the third option 43-3 is selected from the menu window 43, the processor 130 may display a list of other user terminals. The list of terminals may have previously been stored in the user terminal 100.

Figure 4D:
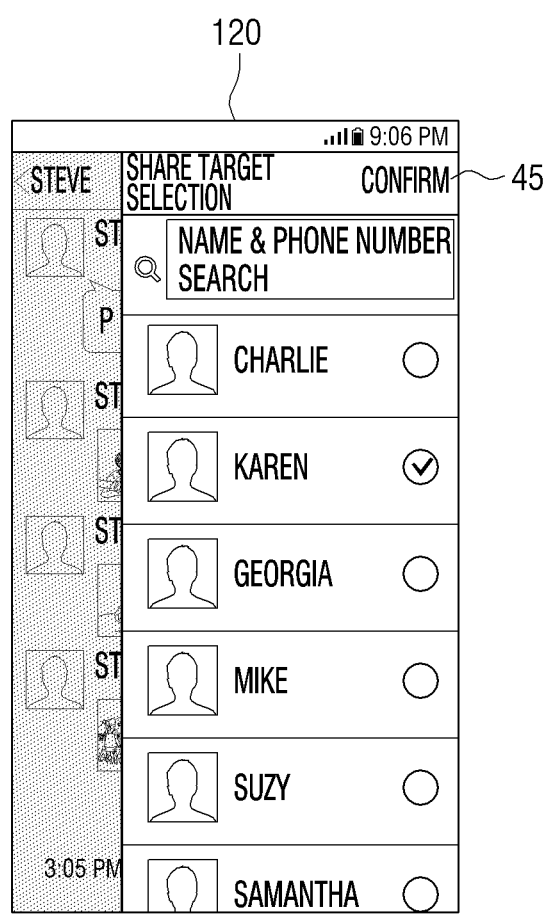

FIG. 4D shows a list 45 from which one or more share targets may be selected, according to an exemplary embodiment. As shown in FIG. 4D, if the third option 43-3 is selected, the processor 130 may display the list 45 from which the share targets may be selected. The user may select from the list 45 at least one terminal associated with another user account. For example, as shown in FIG. 4D, the other terminals may be represented on the list 45 by the respective user accounts or user names (e.g., "Matt," "Karen," "Georgia," etc.) for easy identification. If the user selects at least one other user terminal from the list 45, the selected user terminals may be designated as the share targets.

The fourth option 43-4 may be an option for providing a URL of a landing page that includes shared messages. When the fourth option 43-4 is selected, a share target may not need to be selected. In particular, the landing page may be, for example, a webpage that includes the shared messages. Alternatively, the landing page may be a view, page, or chatroom generated by the messaging application. The page may be temporarily generated by the server 200. If the user selects the fourth option 43-4, the processor 130 may display the temporary URL that links to the landing page that includes the shared messages. The user may share the messages by sharing the URL with the share targets. The URL can be shared via the messaging app or any other means, such as email, texting, in person, etc.

The fifth option 43-5 may be an option for setting a time limit for the shared messages. For example, the user may set an expiration date and/or time for the shared messages through the fifth option 43-5 displayed on the menu window 43. If the set expiration date and/or time is elapsed, the share target may not be permitted to access the shared messages anymore. Particularly, the processor 130 may transmit information regarding the expiration date and/or time to the server 200, and, in a case where the set expiration date and/or time is elapsed, the server 20 may cease to transmit the shared messages to the target terminal anymore.

The sixth option 43-6 may be an option for setting a number of times the shared messages may be accessed by a share target. In other words, the user may set this option to make the shared messages expire after the share target accesses the shared messages the set number of times. For example, in a case where the user sets the access count limit with respect to the shared message as 5, the processor 130 may transmit information regarding the access count limit to the server 200. Whenever the share target access the shared message from the server 200, the server 200 may keep track of the number of times that the shared message was accessed, and the server 20 may restrict access to the shared message once the share target's access to the shared message exceeds the access count limit of 5.

After the selection of the share options is complete on the menu window 43, the user may issue a transmission command (e.g., by touching a transmission icon) to transmit the selected messages to the share target.

Figure 4E:
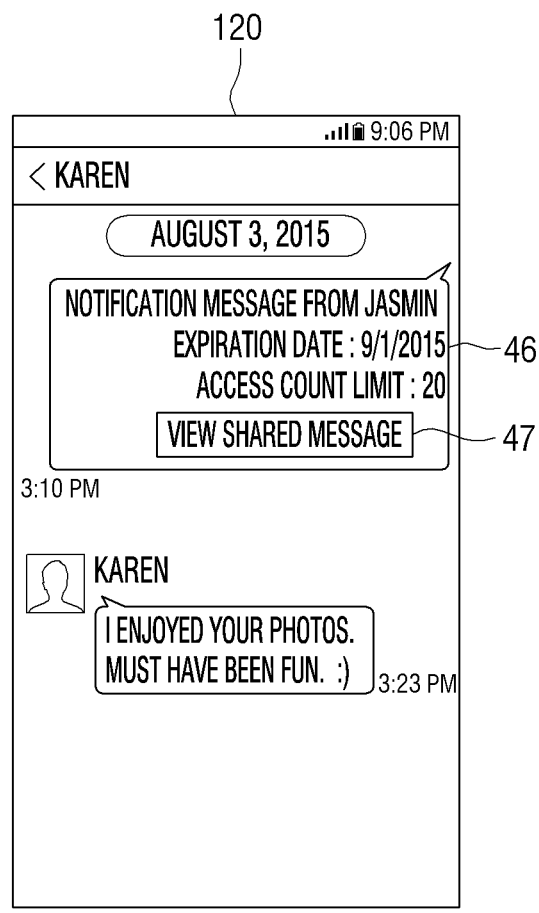

FIG. 4E shows a screen on which a notification message 46 with respect to a shared message is transmitted to a terminal of a share target, according to an exemplary embodiment. As shown in FIG. 4E, after the transmission of the shared message from the user terminal to the server 20 is complete, the notification message 46 containing a URL link to a landing page for accessing the selected message may be transmitted to the terminal of the share target through the server 200. The notification message 46 may include information regarding a share expiration date and/or time of the shared message, allowed access count limit, etc. and a URL link 47 of the landing page for accessing the shared message.

Second Exemplary Embodiment of Receiving a Shared Message

Figure 5:
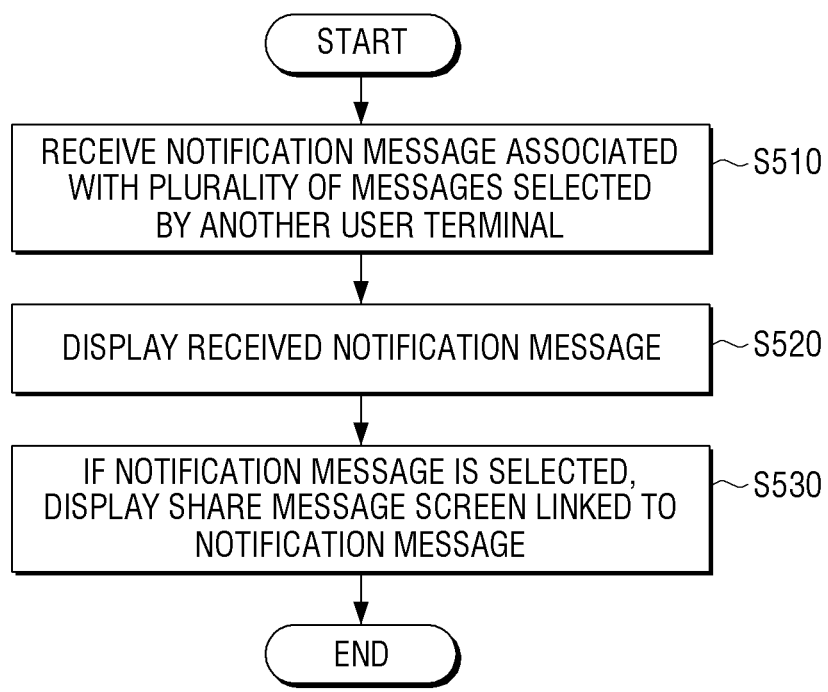
FIG. 5 is a flowchart of a method performed by a user terminal for accessing a shared message, according to an exemplary embodiment.

FIG. 5 is a flowchart of a method performed by the user terminal 100 for accessing a shared message, according to an exemplary embodiment.

First, a notification message associated with a plurality of messages selected by another user terminal may be received (S510). In particular, a process of selecting the plurality of messages in another user terminal and transmitting the plurality of messages to the user terminal 100 may be similar to a process of the first exemplary embodiment described above with reference to FIGS. 4A through 4E. Thereafter, the received notification message may be displayed (S520).

If the notification message is selected, a share message screen linked to the notification message may be displayed (S530). Specifically, if a user activates a URL included in the notification message linking to a landing page, the processor 130 may display the landing page including the shared message. In this regard, the landing page may be a shared message or a page that lists shared messages in chronological order.

Figure 6A:
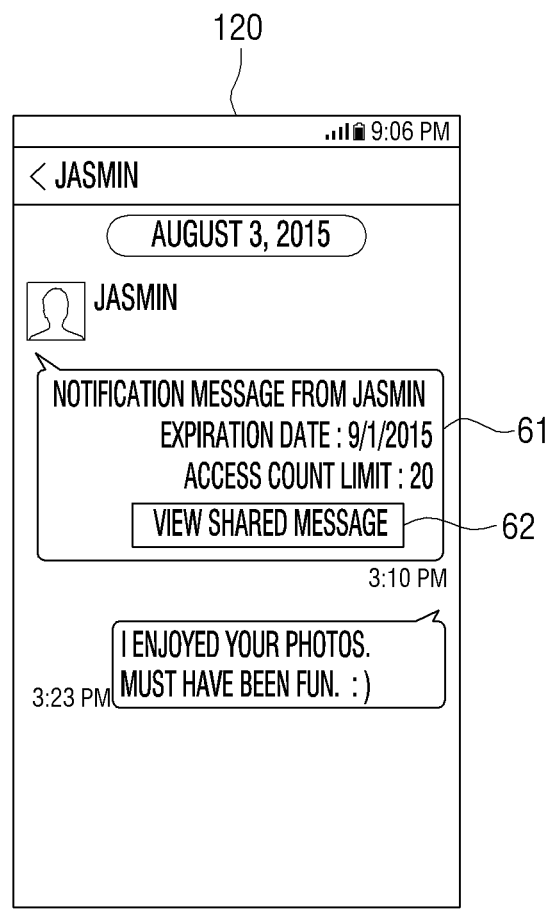
FIGS. 6A and 6B are diagrams showing a process of accessing a shared message, according to an exemplary embodiment.
Figure 6B:
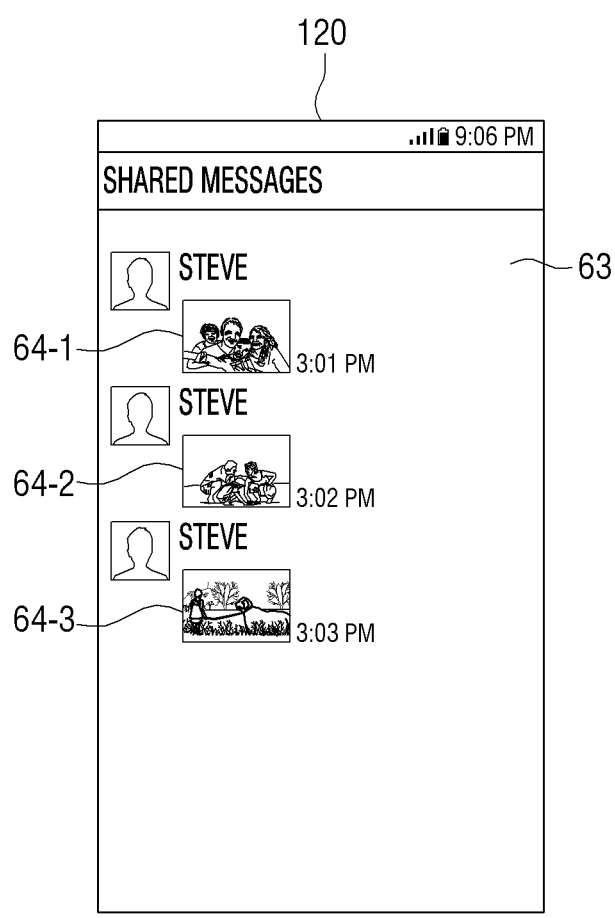

FIGS. 6A and 6B are diagrams showing a process of accessing a shared message, according to an exemplary embodiment.

FIG. 6A shows a messaging application receiving a notification message 61 about the shared message sent from another user terminal, according to an exemplary embodiment. As shown in FIG. 6A, the notification message 61 transmitted from another user terminal may include a URL link 62 to a landing page that includes the shared message.

FIG. 6B shows an exemplary landing page 63, which links to the URL link 62. If a user receives the notification message 61 and activates the URL link 62 (e.g., by touching the link 62), the landing page 63 generated and stored by the server 200 may be displayed. In particular, shared messages 64-1-64-3 (collectively "64") may be those messages selected by another user terminal for sharing.

Third Exemplary Embodiment of Receiving a Share Approval Request

According to an exemplary embodiment, when a recipient of a message wishes to forward the message to a third party, an approval of the original sender may be requested. For example, in a case where a user of a first user terminal apparatus wishes to transfer, via a messaging application, a message, which originated from a second user terminal, to a third user terminal via the same messaging application, the user of the third user terminal may access the message only the user of the second user terminal approves the sharing. The message previously sent by the user of the second user terminal to the first user terminal may be referred to as the approval target message. In one aspect of the exemplary embodiment, if the approval target message was originally sent from a fourth user terminal to the second user terminal apparatus, then the message may be accessed by the third user terminal only when the fourth user terminal approves the sharing. That is, a user terminal that initially created the message may receive a share approval request as an author of the message. In an exemplary embodiment, the approval may need to be obtained from the original author and all the intervening user terminals in order for the final recipient of the shared message to access the message.

Figure 7:
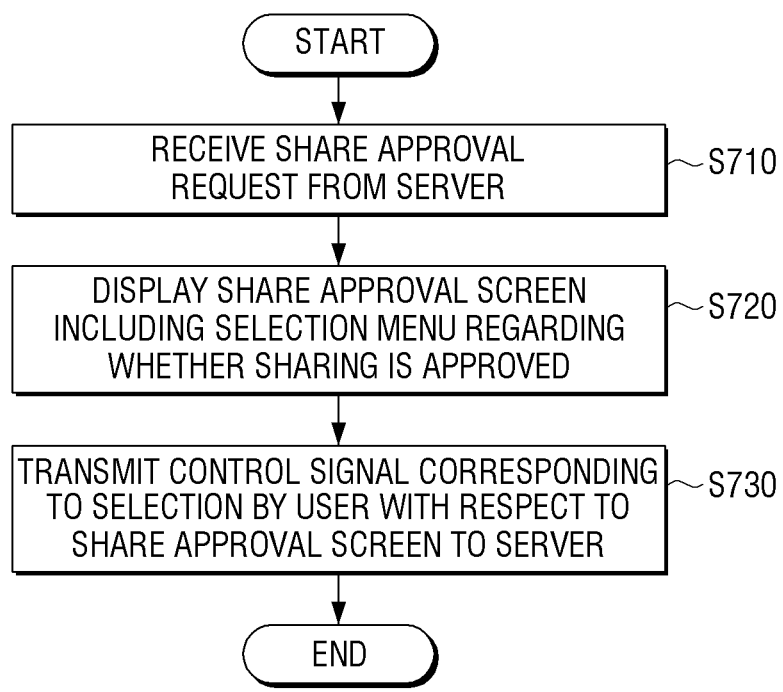
FIG. 7 is a flowchart of a method performed by a user terminal for approving a message share, according to an exemplary embodiment.

FIG. 7 is a flowchart of a method performed by a user terminal for approving a message share, according to an exemplary embodiment.

First, when a second user terminal transfers or forwards a message received from a first user terminal to a third user terminal, the first user terminal may receive a share approval request from the server 200 (S710). In particular, the third user terminal may receive, via the server 200, a notification message regarding a message selected by the second user terminal. However, a share message screen linked to the notification message before the sharing approval request with respect to the first user terminal is accepted may be a screen having the message blanked out until the approval is obtained.

Thereafter, a share approval screen including a selection menu regarding whether sharing is approved may be displayed (S720). The share approval request may be received from the third user terminal in the form of a message including the selection menu regarding whether the sharing should be approved.

Thereafter, a control signal corresponding to a selection by a user with respect to the share approval screen may be transmitted to the server 200 (S730). If a user of the first user terminal approves the sharing by selecting the corresponding option on the share approval screen, a control signal corresponding to the approval may be transmitted to the server 200, and the message may be transmitted from the server 200 to the third user terminal. However, if the user of the first user terminal rejects the approval, a control signal corresponding to the rejection may be transmitted to the server 200, and the message may not be transmitted from the server 200 to the third user terminal apparatus. Thus, in such case, a user of the third user terminal may not view or access the message.

Figure 8A:
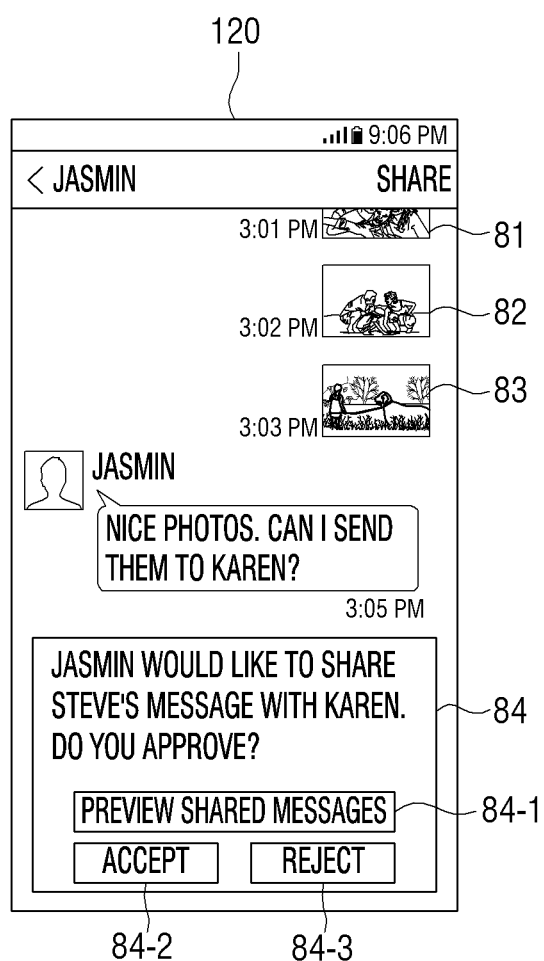
FIGS. 8A through 8C are diagrams showing a process of approving a message share, according to an exemplary embodiment.
Figure 8B:
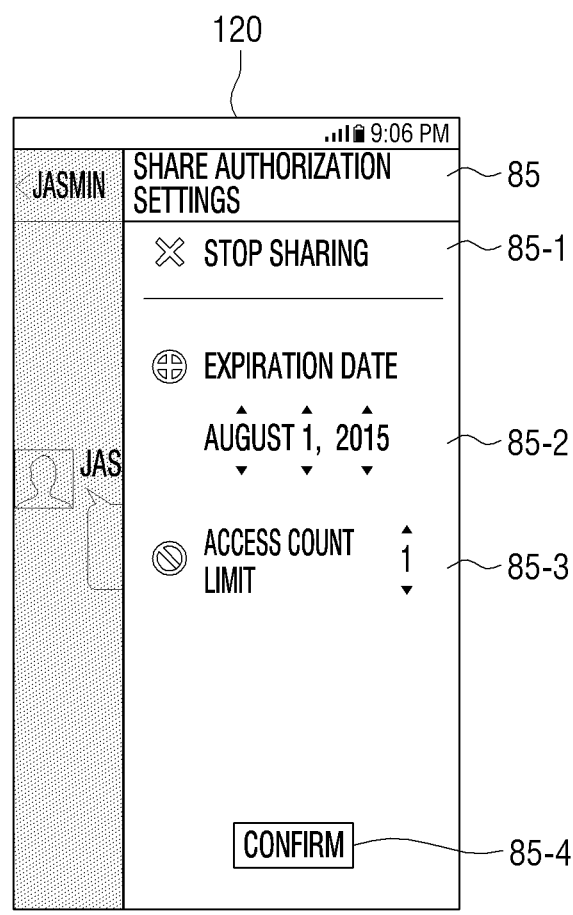
Figure 8C:
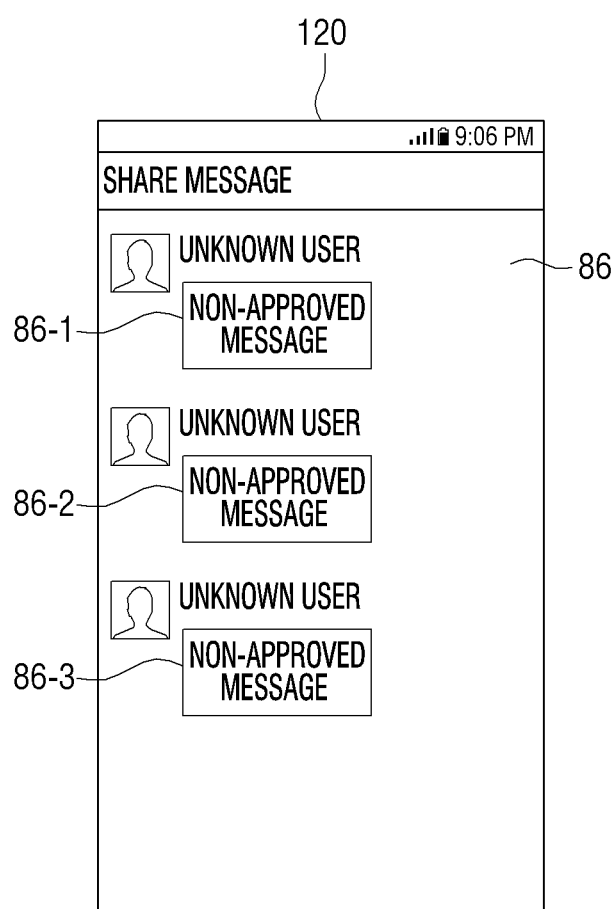

FIGS. 8A through 8C are diagrams showing a process of approving a message share, according to an exemplary embodiment.

FIG. 8A shows a screen that displays a share approval request message, according to an exemplary embodiment. As shown in FIG. 8A, it may be assumed that the user terminal 100 of Steve transmits photo messages 81-83 to a user terminal of Jasmin, and Jasmin wishes to forward the photo messages 81-83 to a user terminal apparatus of Karen. In this example, when Jasmin activates a "share" menu item and transmits the photo messages 81-83 to Karen, the approval request message 84 requesting approval of the share may be displayed on the user terminal 100 of Steve. In other words, whether the server honors Jasmin's request to share the messages 81-83 with Karen may be contingent upon the original transmitter Steve's decision to approve Jasmin's sharing of the messages 81-83 with Karen.

The approval request message 84 may include a "preview share message" menu item 84-1 for previewing a share message, an "approval" menu item 84-2 for accepting the approval request, and a "rejection" menu item 84-3 for rejecting the approval request.

If Steve selects the "preview share message" menu item 84-1, Steve can preview the landing page that includes the messages to be shared with the user terminal of Karen.

If Steve selects the "approval" menu item 84-2, the processor 130 may optionally display a menu window 85 for modifying parameters or limitations with respect to the shared message as shown in FIG. 8B. If a "stop sharing" option 85-1 is selected on the menu window 85, the approval for the messages previously shared with the user terminal of Karen may be rescinded, and Karen's user terminal may no longer be able to access those messages. In addition, the menu window 85 may include an option 85-2 for setting or modifying a share time limit of the shared message, an option 85-3 for setting or modifying an access count limit (i.e., a number of times the shared message may be accessed), etc. When a "confirm" menu item 85-4 is selected, the options and parameters set on the menu window 85 may be applied to the shared message so that the shared message may be transmitted to the user terminal of Karen. Information regarding the options set on the menu window 85 may be transmitted to the server 200 as well. The server 200 may manage authorization of Karen's user terminal with respect to the shared message based on the information regarding the options set on the menu window 85.

If, for example, Steve selects the "reject" menu item 84-3, the processor 130 may transmit a control signal corresponding to this selection of Steve to the server 200. In this case, the server 200 may determine that a request to share the photo messages 81-83 with the user terminal of Karen has been rejected. Thus, the server 200 may withhold transmission of the photo messages 81-83 to the user terminal of Karen. The user terminal of Karen may instead present a landing page 86 linked to a notification message and having redacted regions 86-1-86-3 (collectively "86"), in which the messages 81-83 are replaced with a blank space or a placeholder image or text as shown in FIG. 8C. Related metadata, such as sender identity and timestamps, may also be redacted. Thus, Karen may not be able to view the photo messages 81-83. Alternatively, instead of sending to Karen a link to a landing page 86 containing redacted content, the server 200 may simply refrain from sending any notification message to Karen's user terminal when the share approval request is denied.

FIGS. 9A through 9D are diagrams showing a process of individually selecting and sharing messages received from a plurality of users on a chat screen, according to an exemplary embodiment.

Figure 9A:
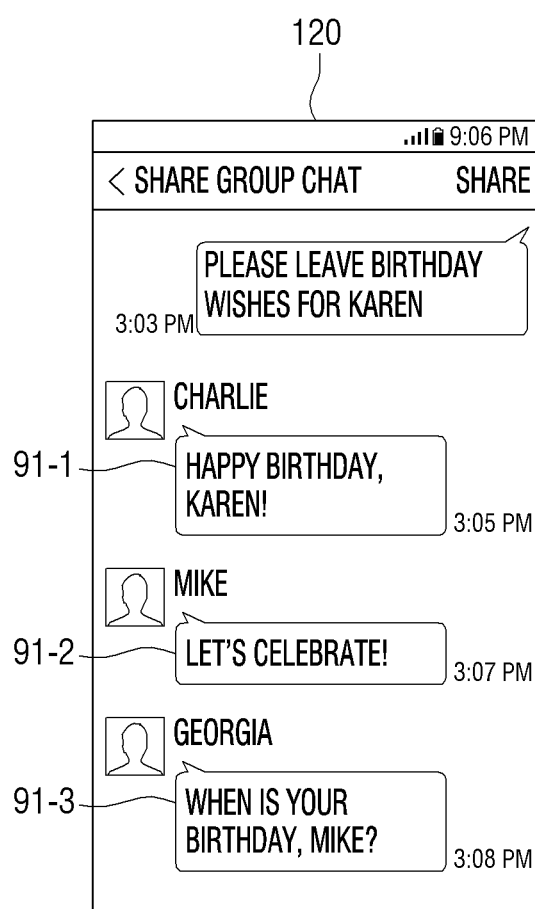
FIGS. 9A through 9D are diagrams showing a process of individually selecting and sharing messages received from a plurality of users on a chat screen, according to an exemplary embodiment.

Specifically, FIGS. 9A through 9D illustrate an exemplary embodiment of transmitting a conversation that took place in a group chatroom to a user who does not belong to the group chatroom. As shown in FIG. 9A, the user terminal 100 may allow a user to select one or more messages 91-1-91-3 (collectively "91") received from a plurality of users and transmit the selected messages to another user terminal. In this regard, a process of selecting messages to share may be similar to the first exemplary embodiment of selecting a plurality of messages to share, as shown in FIGS. 4A through 4E. In this example, a user may individually select only those messages that the user wishes to share with Karen according to the options set on a share menu window a share button 93 on the user terminal 100, and select a share target with which to share the selected messages.

Figure 9B:
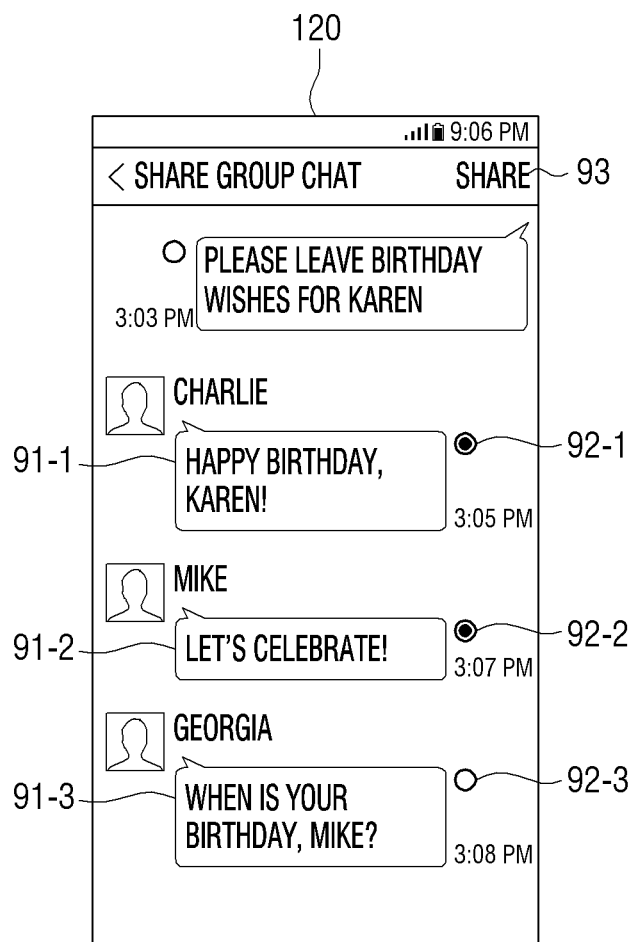

As shown in FIG. 9B, Jasmin, the exemplary user of the user terminal 100 may select a message 91-1 ("Happy birthday, Karen!") of Charlie and a message 91-2 ("Let's celebrate!") of Mike on a message screen to be forwarded to Karen by using selectors 92-1 and 92-2, respectively, but choose not to select a message 91-3 ("When is your birthday, Mike?") of Georgia if it is determined that the message 91-3 is not an appropriate birthday message for Karen.

Figure 9C:
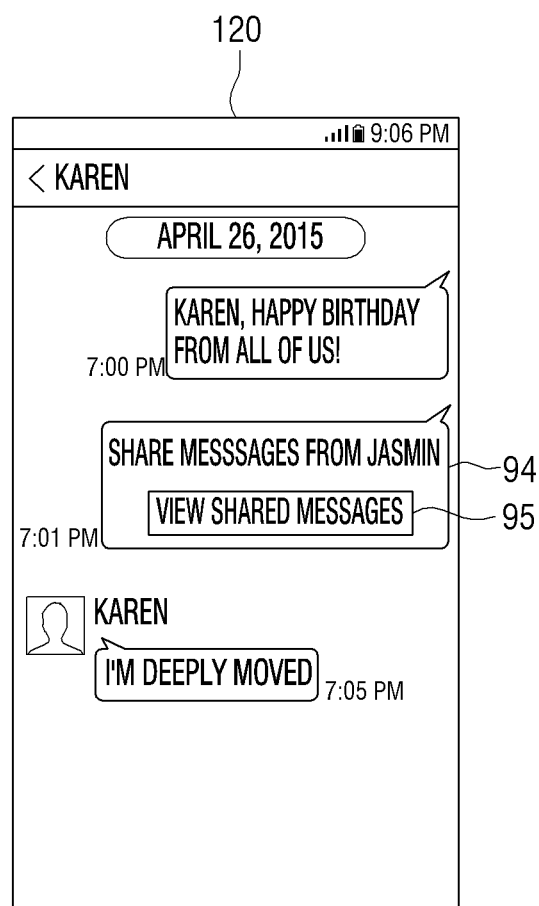

As shown in FIG. 9C, once Jasmin selects the message 91-1 of Charlie, the message 91-2 of Mike, and a user terminal of Karen as the share target, information regarding the selected messages 91-1 and 91-2 and the share target may be transmitted from the user terminal 100 to the server 200. The server 200 may transmit a notification message 94 with respect to the plurality of messages 91-1 and 91-2 selected by the user terminal 100 to the user terminal of Karen. In particular, the notification message 94 may include a URL link 95 to a landing page that includes the shared messages 91-1 and 91-2.

Figure 9D:
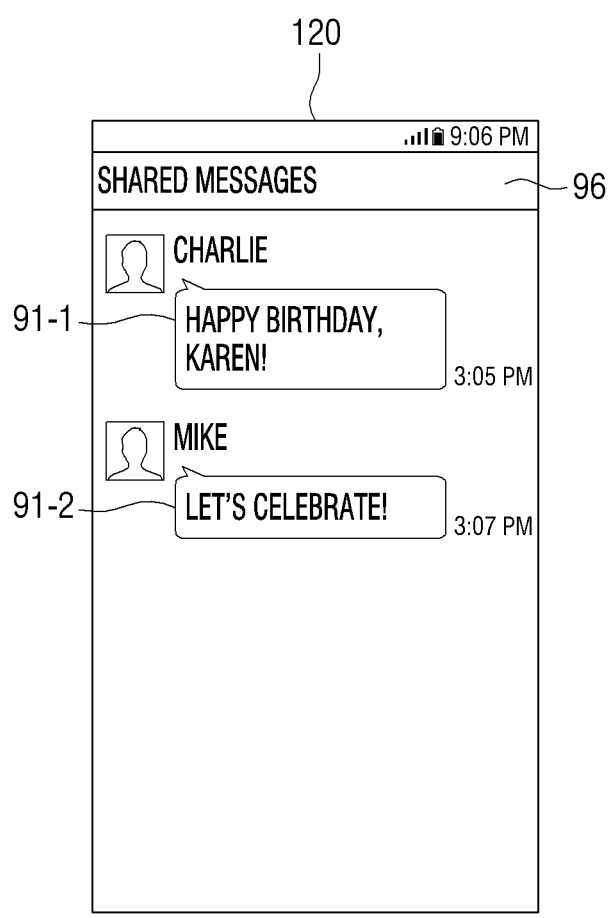

FIG. 9D illustrates an exemplary screen of a landing page 96 displayed when the URL link 95 is activated. As shown in FIG. 9D, the landing page 96 may display the shared messages 91-1 and 91-2 and other metadata, such as information about the users who transmitted the messages 91-1 and 91-2 (i.e., Charlie and Mike), timestamps, etc. The messages 91-1 and 91-2 may be presented in chronological or reverse-chronological order. Prior to sharing the messages 91-1 and 91-2 with Karen's user terminal, the server 200 may transmit a share approval request for the plurality of selected messages 91-1 and 91-2. Depending on the sharing policy associated with the messages 91-1 and 91-2, the share approval request may be sent to Jasmin's user terminal 100, Charlie's user terminal, and/or Mike's user terminal. If the share approval request is not accepted by everyone who received the share approval request or if the share approval request fails to achieve a predetermined percentage of approval from those who received the request, the content of the landing page 96 may be redacted and Karen's user terminal may be restricted from accessing the shared messages 91-1 and 91-2, in a similar fashion to the redacted landing page shown in FIG. 8C. Alternatively, the server 200 may simply refrain from sending a notification message to the user terminal of Karen.

Figure 10A:
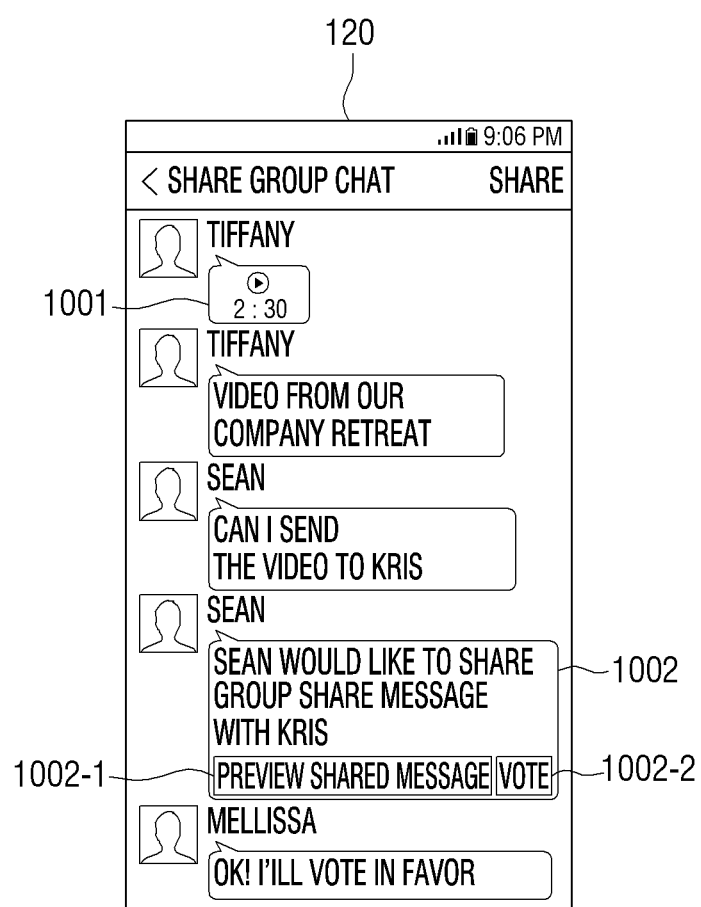
FIGS. 10A and 10B are diagrams showing a process of having a vote on whether to approve a message share, according to an exemplary embodiment.
Figure 10B:
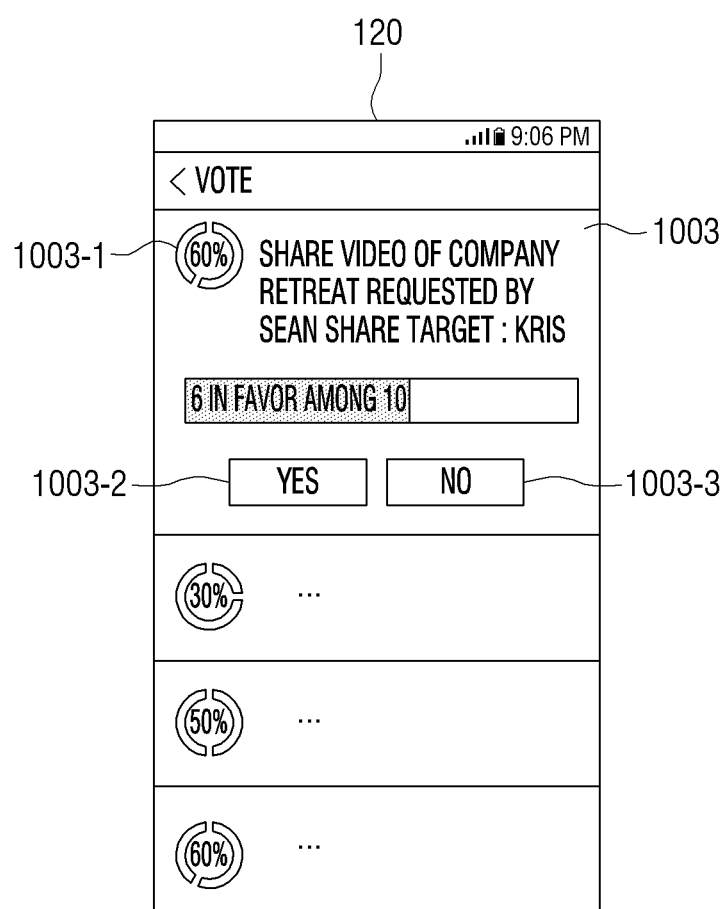

FIGS. 10A and 10B are diagrams showing a process of having a vote on whether to approve a message share, according to an exemplary embodiment.

According to an exemplary embodiment, when a user of a message group having a plurality of group members wishes to share a message uploaded to the group chatroom to a user who does not belong to the message group, a vote can be cast on whether to allow the sharing.

As show in FIG. 10A, in this example, a group member Sam may wish to share a message 1001, which is a video message previously uploaded to a group chatroom for the message group on a messenger application, with Kris, who is not a member of the message group. In this regard, the message 1001 may be selected in a manner similar to the first embodiment shown in FIGS. 4A through 4E. However, in this example, sharing the message 1001 with a non-member Kris may also involve a vote or poll among the group members, and the video message 100 may be transmitted to Kris only when the poll achieves a predetermined percentage of affirmative votes (e.g., unanimity, majority, over 60%, etc.).

To this end, if the message 1001 is selected for sharing, the processor 130 may display a vote message 1002 for allowing the group members to participate in a vote. The vote message 1002 may include a "preview share message" menu item 1002-1 and a "vote" menu item 1002-2. The "preview share message" menu item 1002-1 may be accessed to preview a landing page including the shared message. The "vote" menu item 1002-2 may be accessed to cast a vote on sharing.

As shown in FIG. 10B, if the "vote" menu item 1002-2 is selected by a user, a vote screen 1003 may be displayed for casting a vote on whether to share the message 1001 with Kris, who is not a member of the message group. The vote screen 1003 may include a current voting result, such as a ratio of "yes" votes" to "no" votes among the group members, a "yes" vote button 1003-2, and a "no" vote button 1003-3. A user may select the "yes" vote button 1003-2 or the "no" vote button 1003-3 to cast a vote on whether to share the video message 1001 with Kris.

Figure 11A:
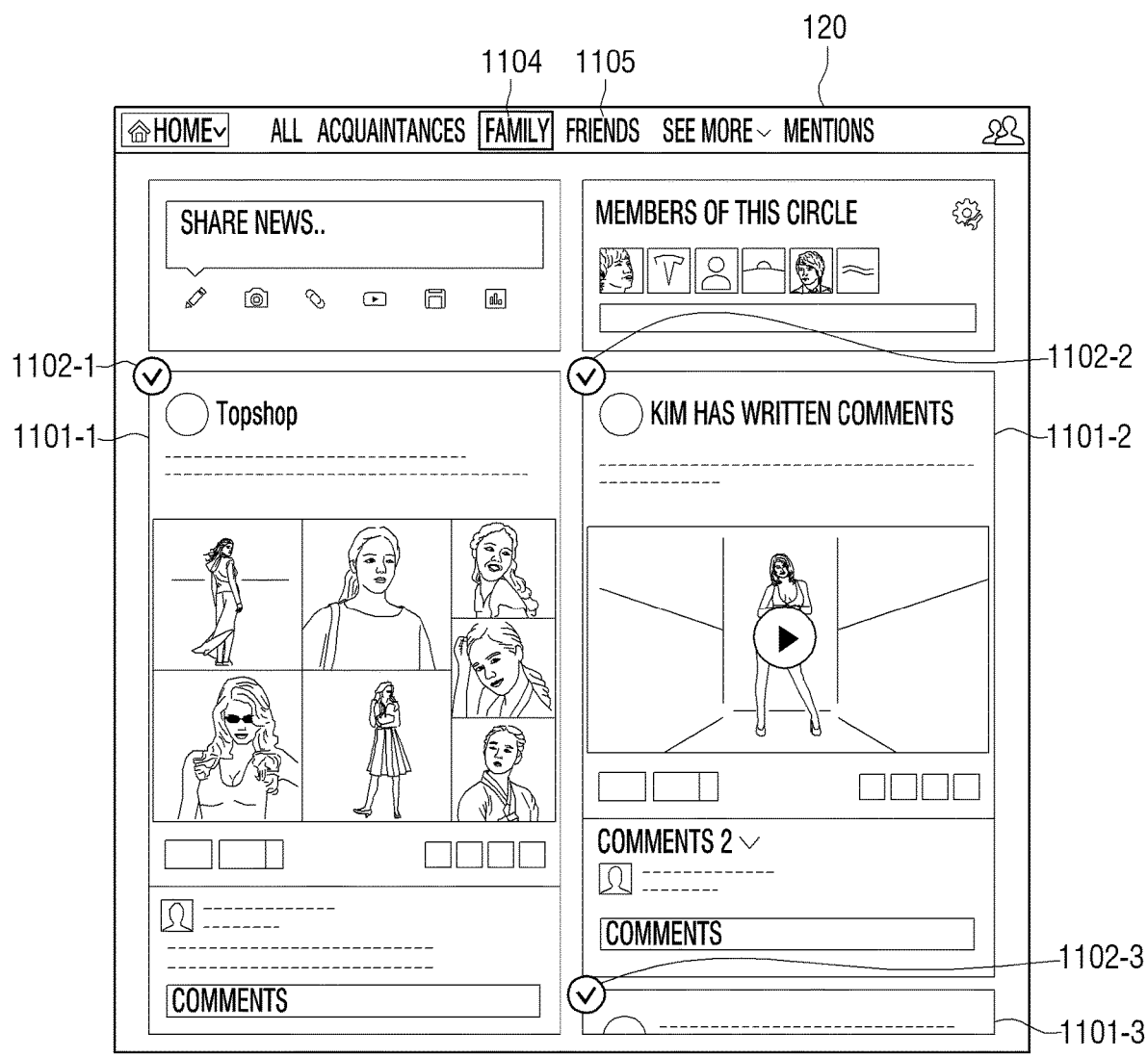
FIGS. 11A and 11B are diagrams showing a process of sharing a post with a group of users on a social media, according to an exemplary embodiment.
Figure 11B:
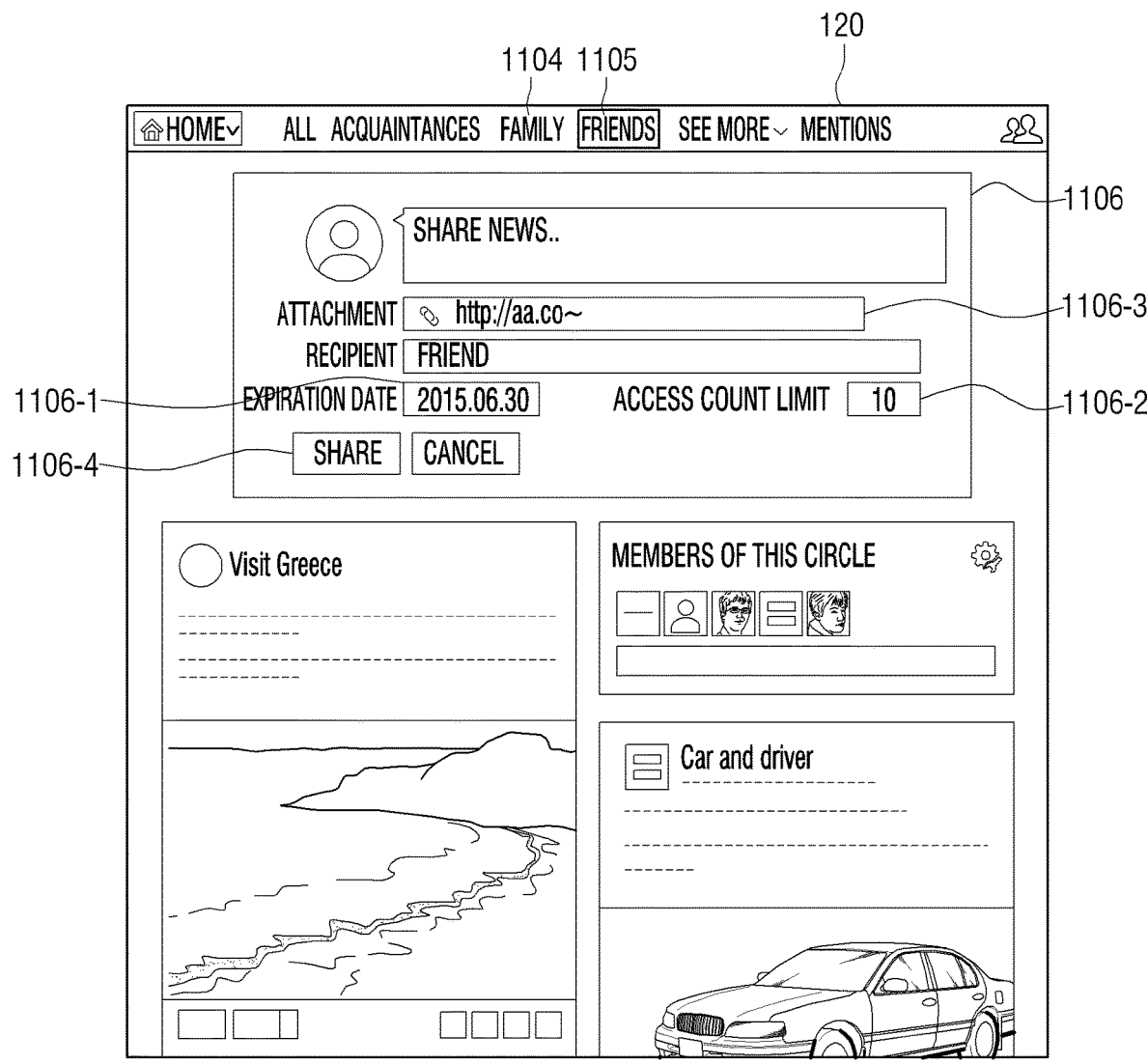

FIGS. 11A and 11B are diagrams showing a process of sharing a post with a group of users on a social media, according to an exemplary embodiment.

FIG. 11A illustrates a World Wide Web (WWW)-based social media service, according to an exemplary embodiment. As shown in FIG. 11A, a user whose account is registered in the server 200 providing the social media service may wish to share various posts or news articles posted in a social group sharing the user's interest or activity. In particular, the user may wish to share a post, which was uploaded by a member of one social group, with members of another social group. For example, the user may wish to share posts uploaded on a group 1104 ("family"), which has only family members of the user as members of the group, with another group 1105 ("friends") by sending the posts to the group 1105. Thus, the user may select one or more of the posts uploaded on the "family" group 1104 to be shared with the "friends" group 1105.

In particular, the user may select one or more posts of the group 1104 to be shared with the group 1105 by interacting with selectors 1102-1-1102-3 (collectively "1102") located, for example, at upper left-hand corners of posts 1101-1-1101-3, respectively. The selectors 1102 may be, for example, buttons or toggles. After the user finishes selecting the posts, the user may access a menu item corresponding to the "friends" group 1105 on a menu bar at the top of the screen of the social media, content (e.g., posts) associated with the "friend" group 1105 may be displayed. In this regard, an authorization settings menu 1106 may be displayed for setting and modifying various parameters for authorization of posts. For example, the authorization settings menu 1106 may be displayed in an upper portion of the view presenting content of the "friend" group 1105. The authorization settings menu 1106 may include an option 1106-1 for setting a share time limit of the shared post, an option 1106-2 for setting an access count limit (i.e., a number of times the shared post may be accessed), and a URL address 1106-3 for the post that is to be shared. If the user activates a "share" button 1106-4, the posts selected from the "family" group 1104 may be sent to and shared with the members of the "friends" group 1105 via the server 200.

Figure 12:
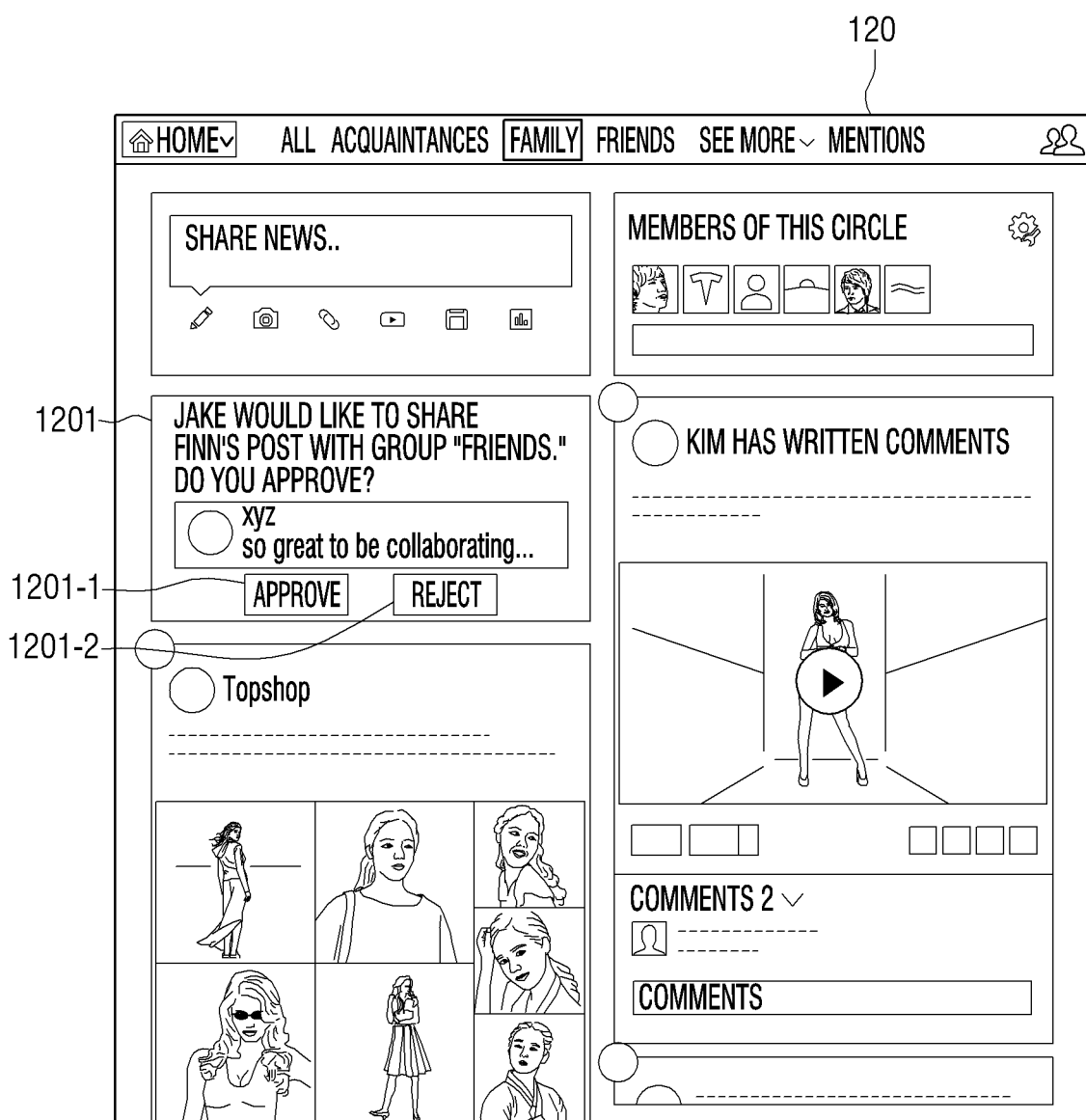
FIG. 12 is a diagram showing a process of obtaining approval for sharing a post, according to an exemplary embodiment.

FIG. 12 is a diagram showing a process of obtaining approval for sharing a post, according to an exemplary embodiment.

According to an exemplary embodiment, when a post uploaded on a first group is to be shared with a second group, a share approval request may be sent to an author of the post that uploaded the post to the first group. If the author of the post approves the share approval request, the post may be accessed by the second group.

For example, as shown in FIG. 12, when a post uploaded on the "family" group 1104 is to be shared with the "friends" group 1105, a share approval request message 1201 may be displayed on the "family" group 1104. The share approval request may be accepted or rejected by an author or uploader of the original post by interacting with either an "approve" button 1201-1 or a "reject" button 1201-2. Meanwhile, according to an exemplary embodiment, sharing of the post may be approved by a group of users, as discussed above, via a vote screen provided by the processor 130. In such a case, the sharing can be approved when a predetermined percentage of affirmative votes (e.g., unanimity, majority, etc.) is achieved.

FIGS. 13A through 13D are diagrams showing a process of sharing a post in the form of a link on a social media, according to an exemplary embodiment.

Figure 13A:
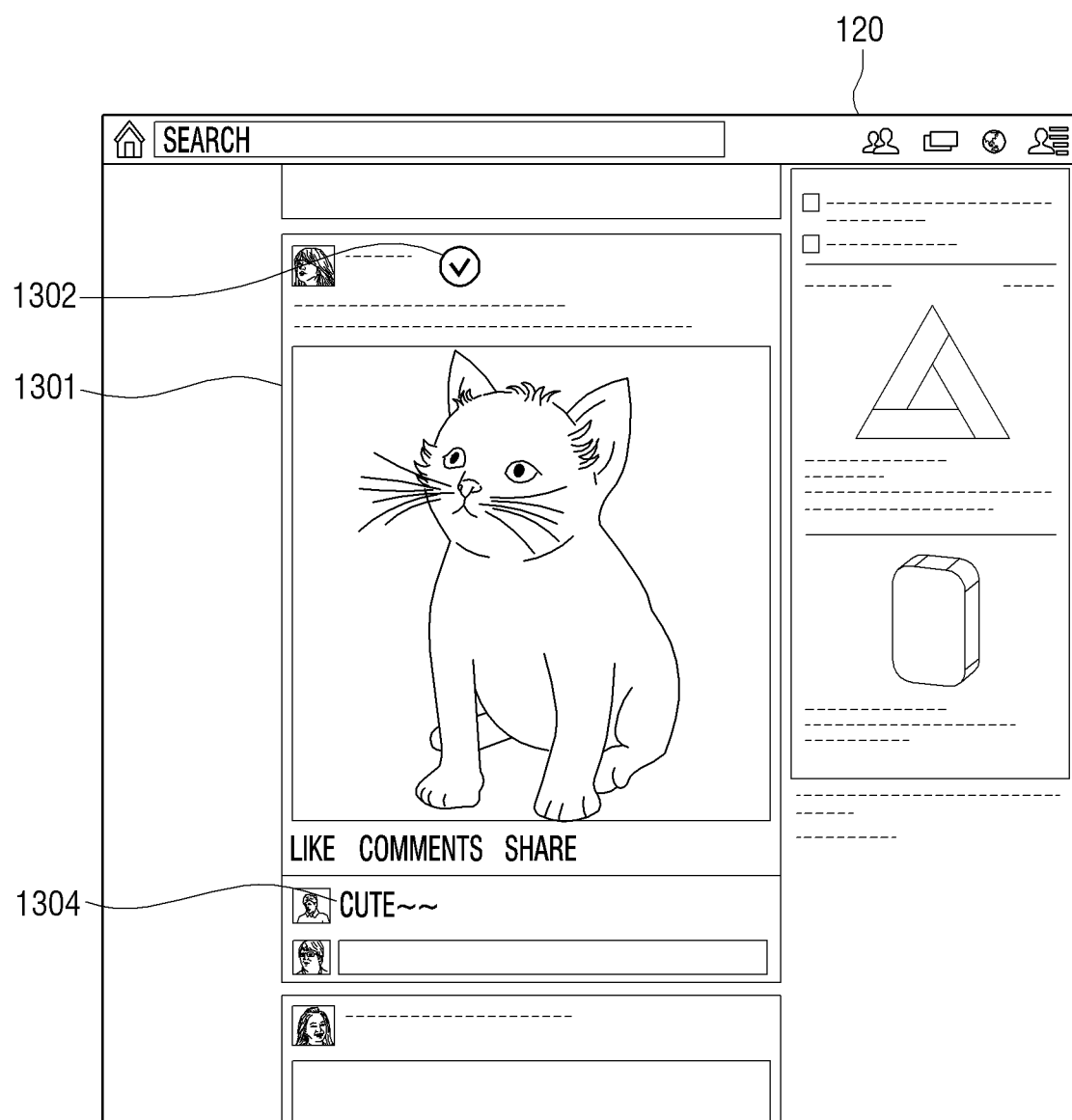
FIGS. 13A through 13D are diagrams showing a process of sharing a post in the form of a link on a social media, according to an exemplary embodiment.
Figure 13B:
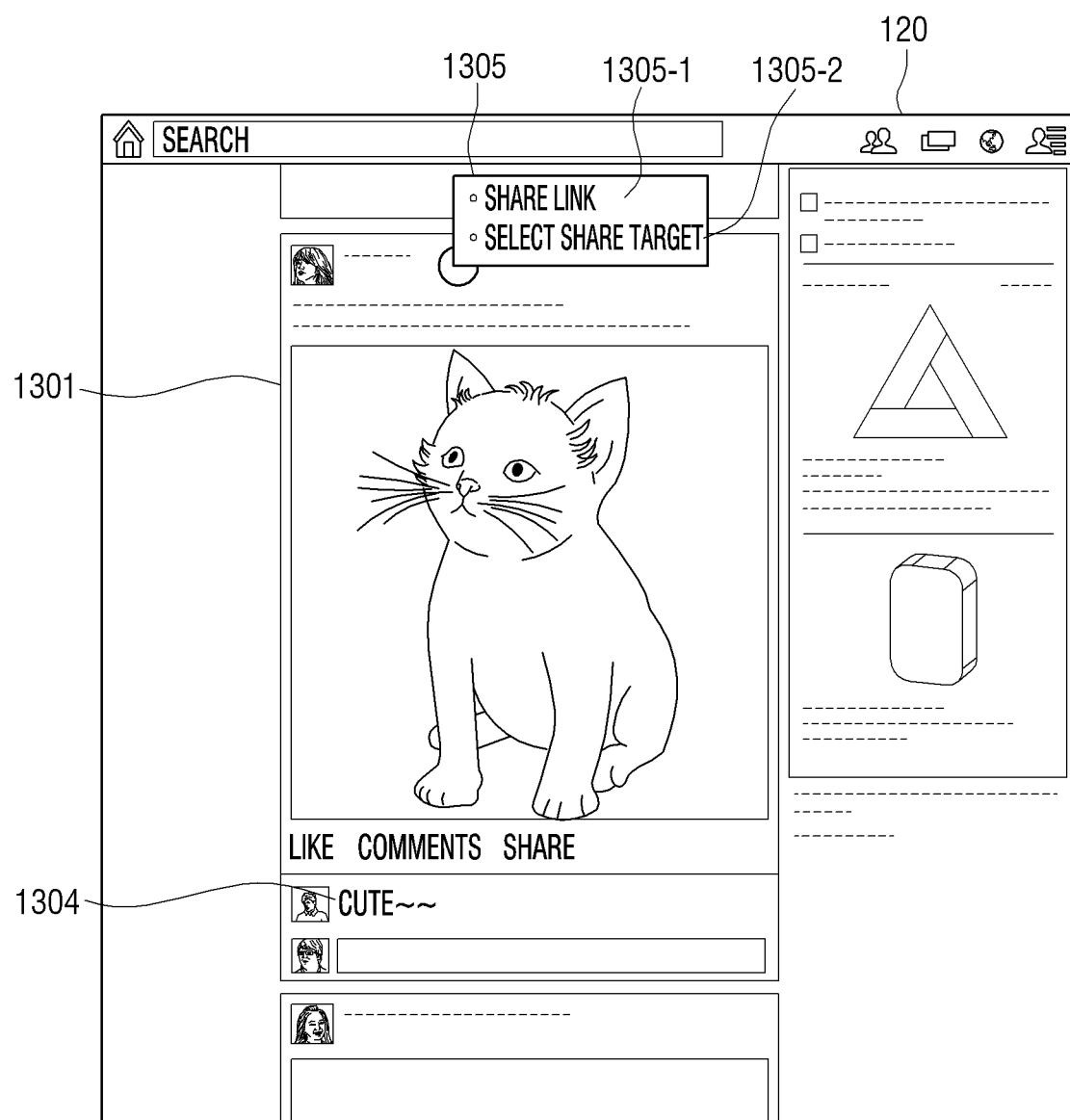

As shown in FIG. 13A, a first user may select a user interface element 1302, such as a button, located, for example, at an upper portion of a post 1301 uploaded by a second user on a social media, and select the post 1301 to share with a third user. In this regard, the shared post may include a message and a comment 1304. As shown in FIG. 13B, if the user selects the user interface element 1302, a menu 1305 may be displayed to inquire whether to share the post 1031 in the form of a link (1305-1) or whether to select a share target (1305-2). If the share target option 1305-2 is selected, the post 1301 may be shared with the third user according to a manner similar to the process shown in FIGS. 11A and 11B above.

Figure 13C:
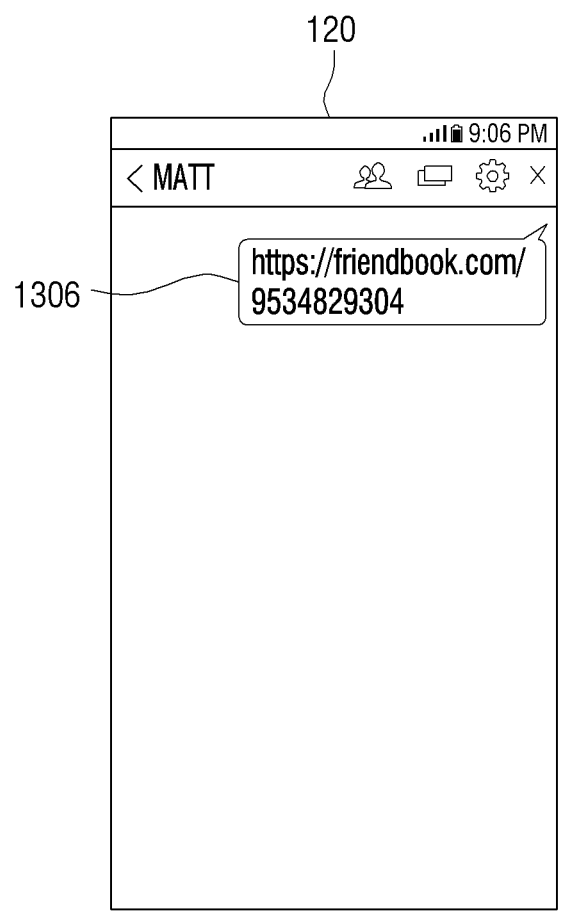

Meanwhile, if the user selects the share link option 1305-1 to share the post 1301 in the form of a link, as shown in FIG. 13C, the server 200 may generate a temporary or permanent URL address 1306 of a landing page including the post 1301, and transmit the generated URL address 1306 to a user terminal of the share target. Moreover, if the user selects the share link option 1305-1, an authorization settings menu with respect to the shared post may be displayed, in a manner similar to the exemplary embodiments described above with respect to FIGS. 4B, 8B, and 11B. Thus, the user may set a share time limit or an access count limit with respect to the shared post through the authorization settings menu.

Figure 13D:
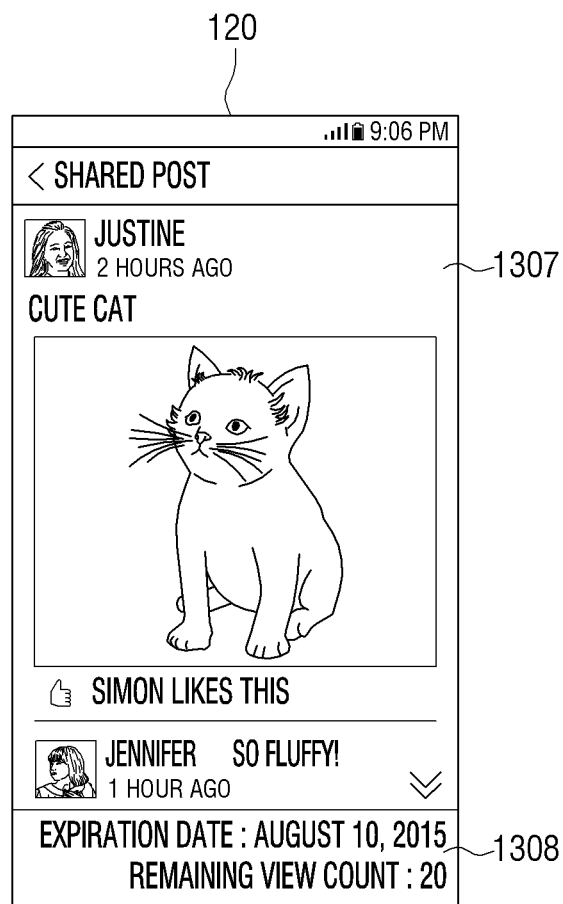

FIG. 13D illustrates an exemplary landing page including a shared post 1301, according to an exemplary embodiment. The landing page may include a message 1307, a comment, a share time limit, and an access count limit (or remaining access count) 1308 for the post 1301.

FIGS. 14A through 14E are diagrams showing a process of sharing a file with another user via a cloud service, according to an exemplary embodiment. The cloud service may refer to an online content storage service (also referred to as a file hosting service, a web-based storage solution, etc.) that allows users to store and synchronize various types of content (e.g., documents, photos, videos, audios, files, data, etc.) on a remote storage accessible by a terminal via a network such as the Internet.

Figure 14A:
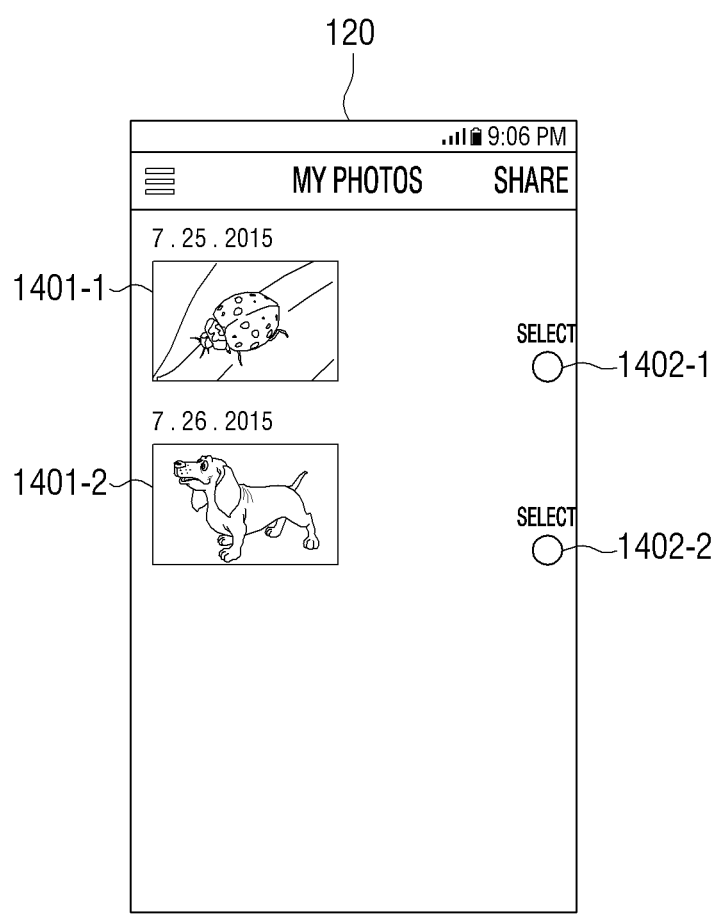
FIGS. 14A through 14E are diagrams showing a process of sharing a file with another user via a cloud service, according to an exemplary embodiment.

FIG. 14A illustrates files stored in a storage space provided by the cloud service, according to an exemplary embodiment. Various types of files such as text, image, videos, etc. may be stored in the storage. As shown in FIG. 14A, a user interface for the cloud service is showing that the online storage is storing at least two image files 1401-1 and 1401-2. The user interface is also displaying selection user interface elements 1402-1 and 1402-2 for selecting the image files 1401-1 and 1402-2, respectively. The selection user interface elements 1402-1 and 1402-2 may be, for example, buttons, toggles, etc.

Figure 14B:
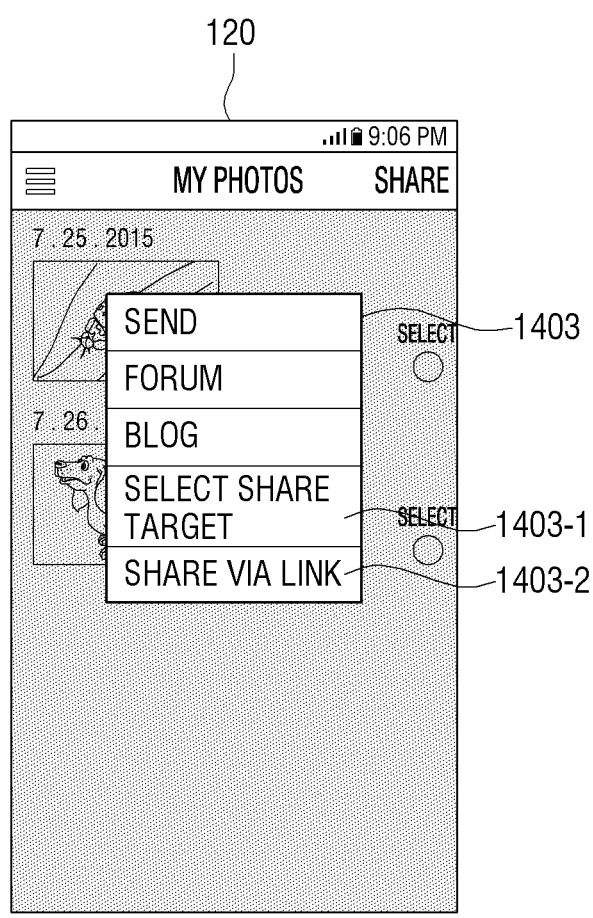

As shown in FIG. 14B, if a user selects the two image files 1401-1 and 1401-2 and activates a share command (e.g., by interacting with a share button), a first menu 1403 for selecting a method of sharing the selected image files 1401-1 and 1401-2 may be displayed.

Figure 14C:
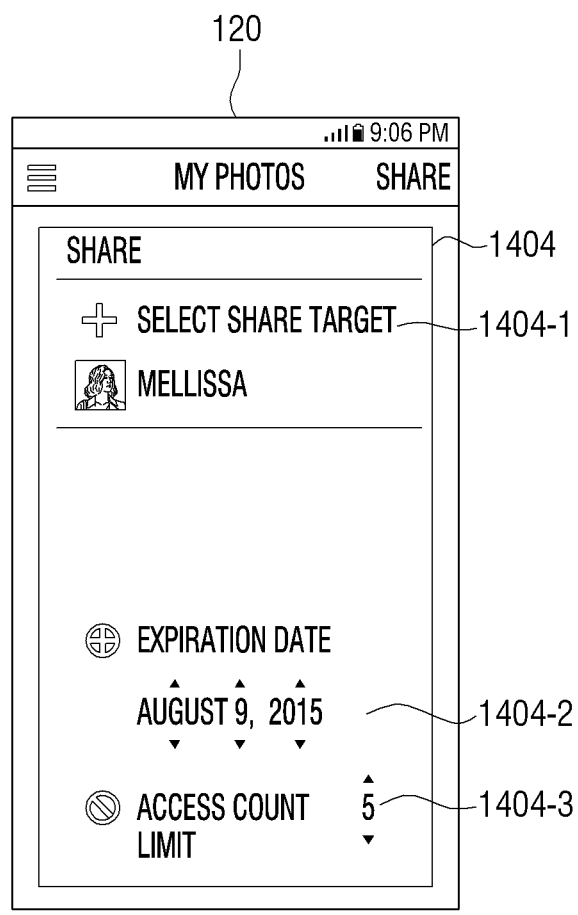

If a share target selection option 1403-1 is selected on the first menu 1403, as shown in FIG. 14C, a second menu 1404 for selecting a share target and setting authorization parameters may be displayed. The second menu 1404 may include an option 1404-1 for selecting the share target, an option 1404-2 for setting a share time limit of the message to be shared, and an option 1404-3 for setting an access count limit (i.e., a number of times the message may be accessed). Once share options and parameters are finalized, the image files 1401-1 and 1401-2 may be shared with a terminal of the selected share target according to the share time limit and the access count limit that were set with respect to the image files 1401-1 and 1401-2.

Figure 14D:
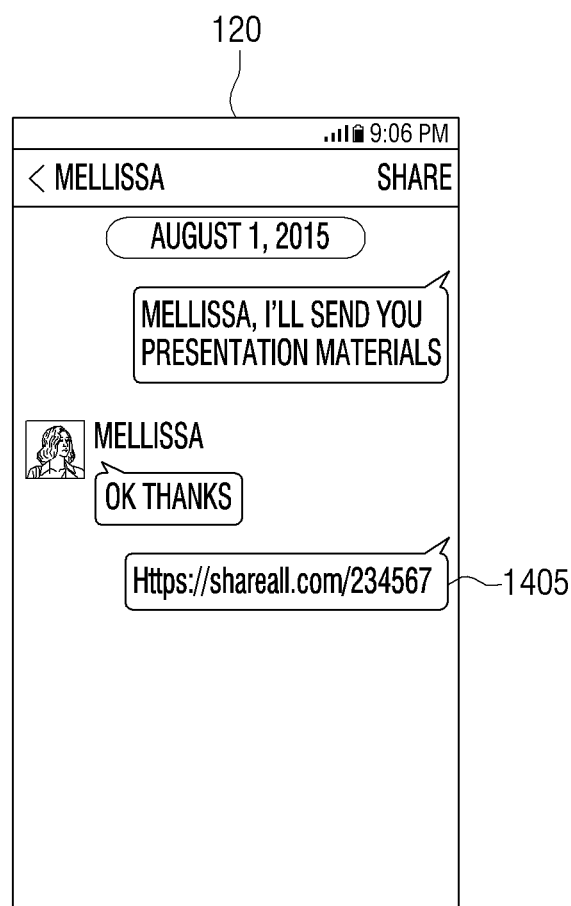

Meanwhile, if a share via link 1403-2 is selected on the first menu 1403, in a similar manner, the second menu 1404 for selecting the share target and setting authorization parameters may be displayed. After the share options and parameters are finalized on the second menu 1404, the server 200 may generate a landing page for accessing the shared files. In parallel, as shown in FIG. 14D, a temporary or permanent URL address 1405 linked to the generated landing page may be transmitted to the terminal of the share target in the form of a message.

Figure 14E:
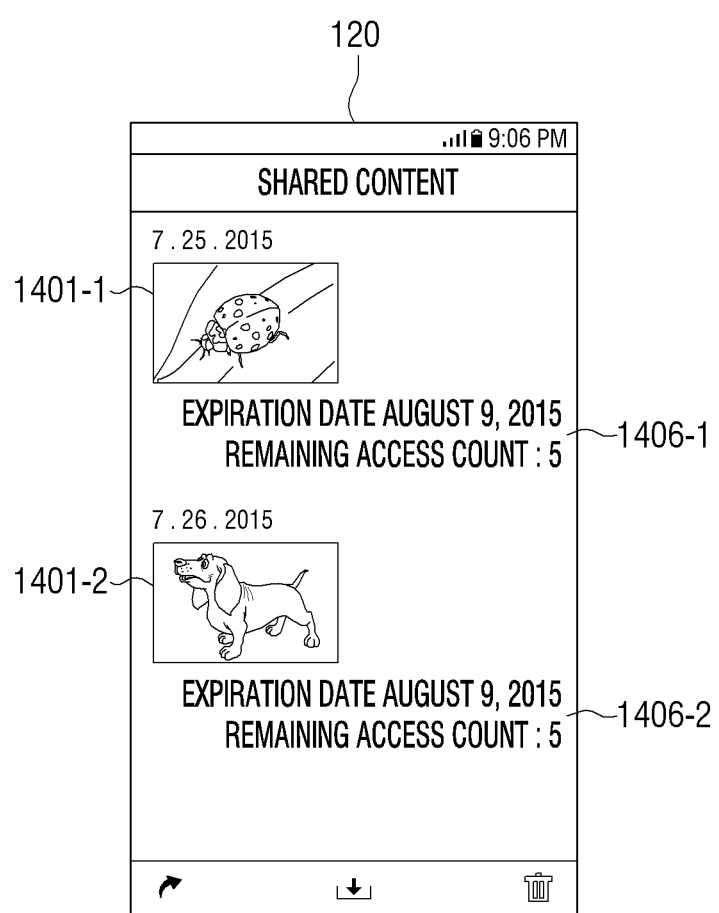

FIG. 14E illustrates an exemplary landing page for accessing the shared files 1401-1 and 1401-2, according to an exemplary embodiment. The landing page may display the shared files 1401-1 and 1401-2 and other metadata 1406-1 and 1406-2, such as information regarding the share time limit, access count limit, and remaining access count with respect to the shared files 1401-1 and 1401-2.

Figure 15:
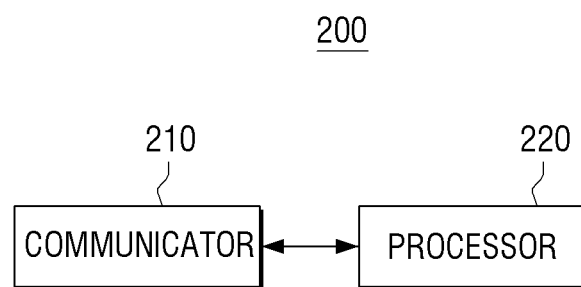
FIG. 15 is a block diagram of a simplified configuration of a server, according to an exemplary embodiment.

FIG. 15 is a block diagram of a simplified configuration of the server 200, according to an exemplary embodiment.

Referring to FIG. 15, the server 200 according to an exemplary embodiment may include a communicator 210 and a processor 220.

The communicator 210 may communicate with a plurality of user terminals. The server 200 may, for instance, communicate in the same manner as the user terminal 100, and thus the communicator 210 of the server 200 may have the same or similar configuration as that of the communicator 110 of the user terminal 100, as described above with reference to FIG. 2.

If a share request with respect to a plurality of messages is received from one of a plurality of user terminals, the processor 220 may generate a share message screen that combines the plurality of messages. In this regard, the share message screen may be a landing page containing the plurality of messages. The processor 220 may generate a notification message linked to the share message screen and transmit the notification message to at least one share target terminal designated by the share request.

Meanwhile, in a case where at least one of the plurality of messages is a message uploaded by another user terminal, the processor 220 may transmit a share approval request for the message to the other user terminal.

Figure 16:
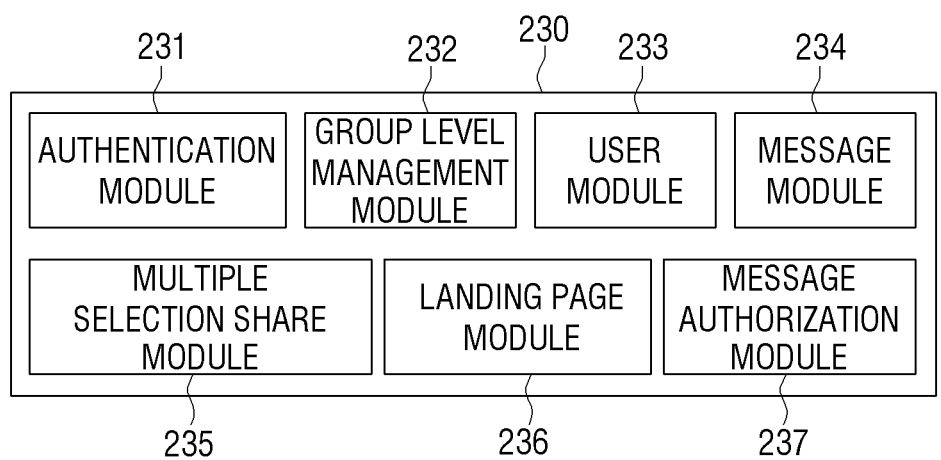
FIG. 16 is a diagram showing various modules of a server, according to an exemplary embodiment.

FIG. 16 is a diagram showing various modules of the server 200, according to an exemplary embodiment.

Referring to FIG. 16, the server 200 may further include storage 230. The storage 230 may be a computer-readable storage medium or device that includes an authentication module 231, a group level management module 232, a user module 233, a message module 234, a multiple selection share module 235, a landing page module 236, and a message authorization module 237.

The authentication module 231 may perform authentication on a plurality of user terminals. In a case where the user terminal 100 accesses the server 200 and requests a login, the server 200 may perform a login procedure with reference to information stored in a database storing user account information and control the authentication module 231 to perform authentication according to authentication information of a user terminal transmitted from each of the plurality of user terminals. In this regard, the authentication information of the user terminal may include an identifier of the user terminal, an Internet Protocol (IP) address, and/or a serial code. For example, because a computer is typically assigned an internal IP address, authentication may be performed using the IP address. In a case where the user terminal is a smartphone, authentication may be performed using an identifier or a serial code of the user terminal, such as an electronic serial number (ESN), International Mobile Station Equipment Identity (IMEI), mobile equipment identifier (MEID), etc.

The group level management module 232 may be a module for assigning a security level to a message group including the plurality of user terminals. For example, in a case where the message group has a "high" security level, sharing of a message uploaded on the message group may not be allowed, such as sending the message to another user terminal not belonging to the message group. Thus, the sharing function may be disabled with respect to users or user terminals outside the message group.

Meanwhile, in a case where the message group has a "medium" security level, sharing of messages uploaded on the message group may be permitted on condition that a share approval from the one or more uploaders or authors of the message. In a case where the message group has a "low" security level, messages uploaded on the message group may be shared with other users or user terminals outside the message group without any limitation.

The security level of the message group may be set by the user in the user terminal 100. Once the security level information is transmitted to the server 20, the group level management module 232 may manage the security level of the message group.

The user module 233 may be a module storing and managing information regarding user accounts and user terminals registered with the server 200.

After the user terminal 100 logs into the server 200, the message module 234 may receive messages input through a messaging user interface, such as a chat window, and transmit the messages to other user terminals. The transmitted messages may be stored in a message information database. The message module 234 may manage the generated messaging user interface, information regarding the chatroom, and information (e.g., a chatroom identifier, member information, etc.) regarding a plurality of members participating in the generated chatroom.

The multiple selection share module 235 may display messages on a message screen in an individual selection mode and allow multiple selections of the messages.

The landing page module 236 may, in a case where messages are shared with another user, generate a landing page and display the shared messages sequentially on the generated landing page. In case the uploader or author of the message does not approve the share approval request, the landing page module 236 may provide a redacted landing page that has the content of the shared messages redacted.

The message authorization module 237 may set authorization parameters on a message shared with the selected share target. In particular, the message authorization module 237 may set a share time limit of the shared message according to a user input or an access count limit (i.e., a number of times the shared message may be accessed). If the share time limit of the shared message is reached or the access count exceeds the access count limit, then the message authorization module 237 may deny access to the shared message.

Figure 17:
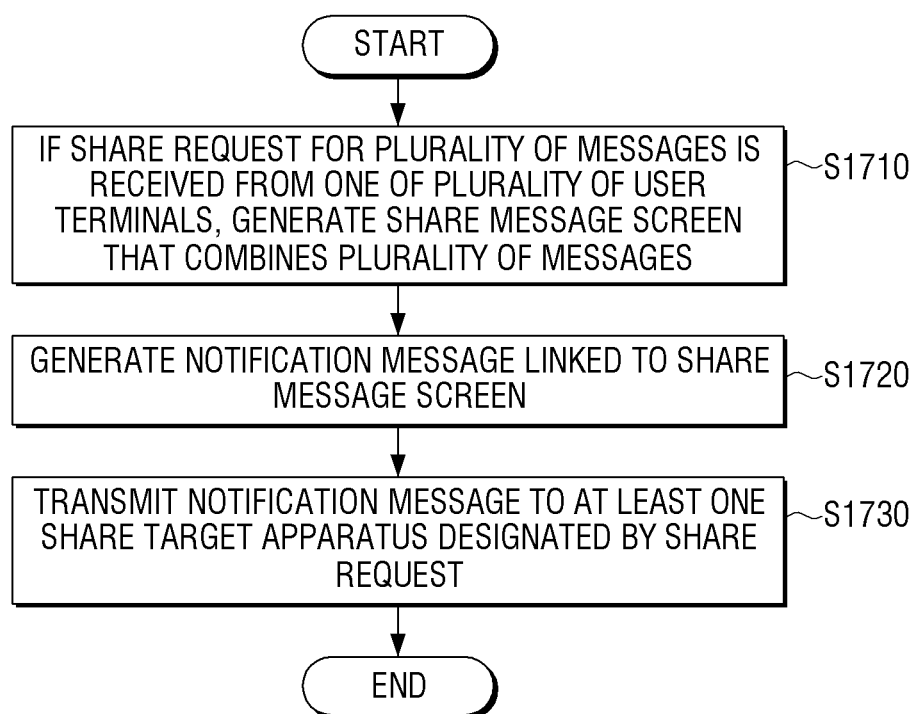
FIG. 17 is a flowchart of a method performed by a server, according to an exemplary embodiment.

FIG. 17 is a flowchart of a method performed by a server, according to an exemplary embodiment.

First, if a share request for a plurality of messages is received from one of a plurality of user terminals, a share message screen that combines the plurality of messages may be generated (S1710).

Thereafter, a notification message linked to the share message screen may be generated (S1720).

Thereafter, the notification message may be transmitted to at least one share target designated by the share request (S1730).

Meanwhile, if at least one of the plurality of messages is a message uploaded or authored by another user or user terminal, a share approval request for the message may be transmitted to the other user or user terminal.

Figure 18:
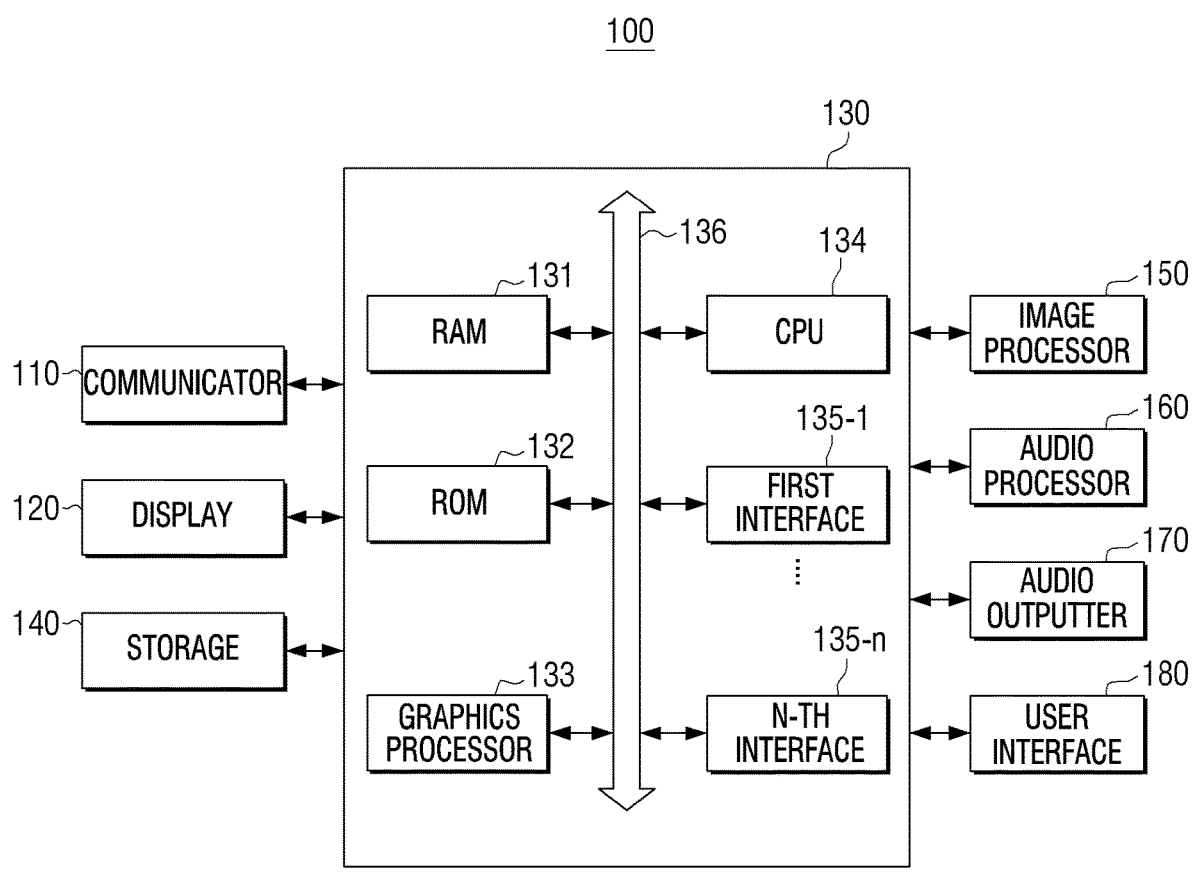
FIG. 18 is a block diagram of a detailed configuration of a user terminal, according to an exemplary embodiment.

FIG. 18 is a block diagram of a detailed configuration of a user terminal 100, according to an exemplary embodiment. Referring to FIG. 18, the user terminal 100 according to an exemplary embodiment may include the communicator 110, the display 120, the processor 130, the storage 140, an image processor 150, an audio processor 160, an audio outputter 170, and a user interface 180. However, one or more components of the user terminal 100, as shown in FIG. 18, may be replaced, substituted, or omitted according to various embodiments of the user terminal 100. Moreover, additional components not shown in FIG. 18 may be added to the user terminal 100. Descriptions of those components illustrated in FIG. 2 that are redundant with components in FIG. 18 may also apply to the components shown in FIG. 18.

The processor 130 may control the general operation of the user terminal 100. Particularly, the processor 130 may include a RAM 131, a ROM 132, a graphics processor 133, a central processing unit (CPU) 134, first through n-th interfaces 135-1-135-n (collectively "135"), and a bus 136. The RAM 131, the ROM 132, the graphics processor 133, the CPU 134, and the first through n-th interfaces 135 may be connected to one another through the bus 136.

The CPU 134 may access the storage 140 to perform a booting sequence using an operating system (OS) stored in the storage 140. The CPU 134 may perform various operations using various software programs, applications, content, data, etc. that are stored in the storage 140.

The RAM 131 may store a set of instructions, commands, etc. for booting a system. If a turn-on command is input and thus power is applied, the CPU 134 may copy the OS stored in the storage 140 to the RAM 131 according to the instructions stored in the ROM 132 and may execute the OS to boot the system. If the boot sequence for the system is complete, the CPU 134 may copy various application programs stored in the storage 140 to the RAM 131 and execute the application programs in the RAM 131 to perform various operations.

The graphics processor 133 (also referred to as a graphics processing unit) may generate a screen or view that includes various graphical objects, such as icons, images, text, etc. using an arithmetic operator and a renderer. The arithmetic operator may calculate various attribute values for graphical objects, such as a coordinate value, a shape, a size, a color, etc., according to a layout of the screen. The renderer may generate a screen image of various layouts having graphical objects based on the attribute values calculated by the arithmetic operator.

The first through n-th interfaces 135 may be connected to the other components described above. One of the first through n-th interfaces 135, for example, may be a network interface connected to an external apparatus via a network.

Meanwhile, the above-described operations of the processor 130 may be performed through the programs stored in the storage 140.

The storage 140 may store an OS software module and various pieces of data such as various pieces of multimedia content for driving the user terminal 100.

In particular, the storage 140 may store a base module that processes various signals transmitted from each of the hardware components of the user terminal 100, a storage module that manages a database (DB) or a registry, a graphics processing module that generates a layout screen, a security module, etc. In addition, the storage part 140 may store a communications module that transmits and receives a message on a messaging application according to an exemplary embodiment.

The image processor 150 may performs various image processing tasks such as decoding, scaling, noise filtering, frame rate conversion, resolution conversion, etc. on image content.

The audio processor 160 may process audio data. In particular, the audio processor 160 may process pronunciation information including a touch gesture to convert the pronunciation information into voice data, and transmit the converted voice data to the audio outputter 170.

The audio outputter 170 may output the audio data processed by the audio processor 160. The audio outputter 170 may output the converted audio or voice data via a receiver or a speaker.

The user interface 180 may detect a user interaction for controlling general operations of the user terminal 100.

Figure 19:
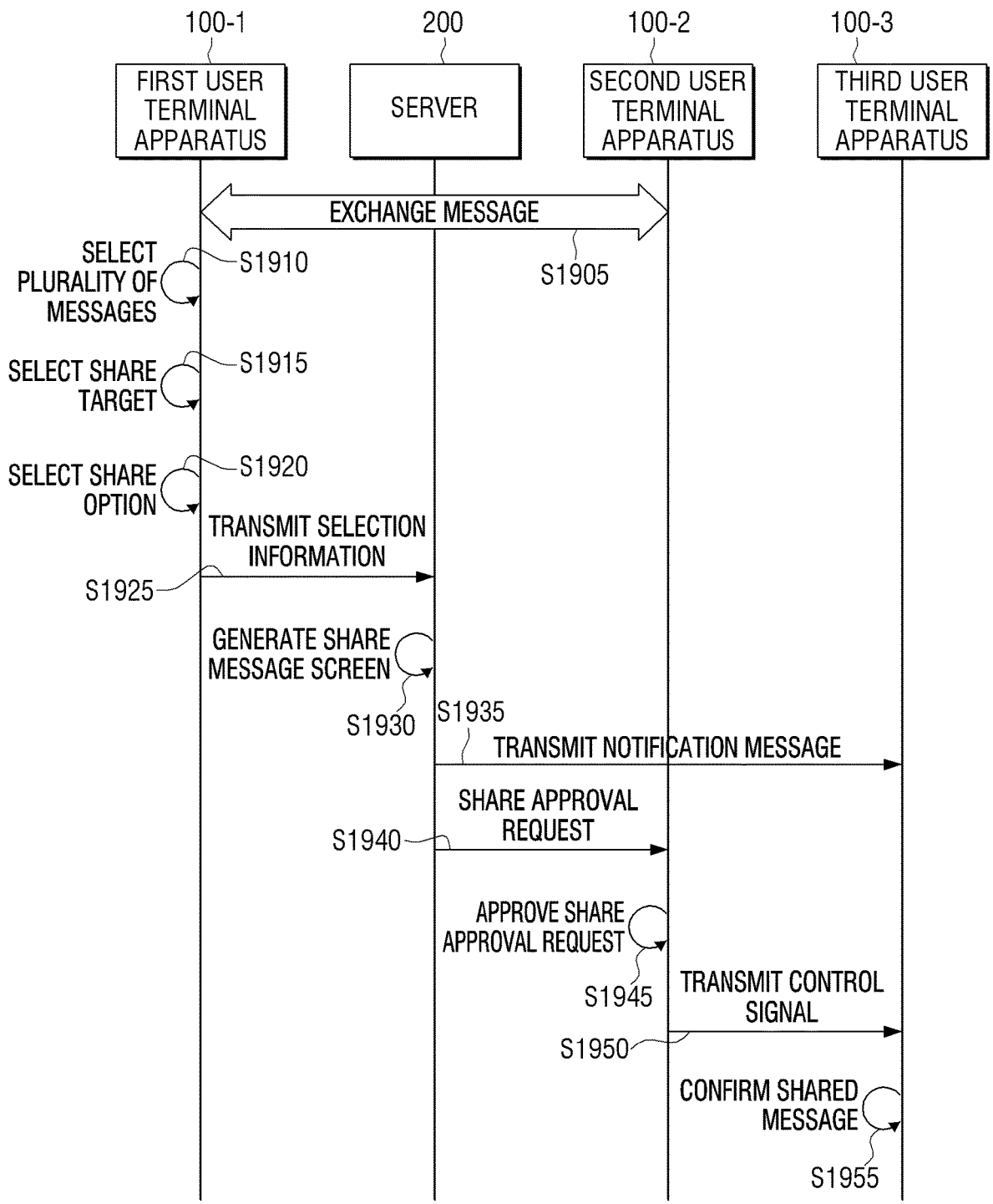
FIG. 19 is a sequence diagram showing a message share process among a server, a first user terminal, and a second user terminal, according to an exemplary embodiment.

FIG. 19 is a sequence diagram showing a message share process between the server 200 and first and second user terminals 100-1 and 100-2, according to an exemplary embodiment.

First, the first and second user terminal apparatuses 100-1 and 100-2 may exchange a message via the server 200 (S1905). Thereafter, the first user terminal 100-1 may select a plurality of messages received from the second user terminal 100-2 (S1910), and select, from a share menu, the third user terminal 100-3 as a share target (S1915). Share options may be selected on the share menu (S1920).

The first user terminal 100-1 may transmit information regarding the selected messages, the share target, and the share options to the server 200 (S1925). The server 200 may generate a share message screen that is to be transmitted to the third user terminal 100-3 based on the information received from the first user terminal 100-1 (S1930). At this time, the landing page may include the selected messages to be shared. Alternatively, the landing page may be a blank page at this time. In another alternative case, the landing page may contain redacted content at this time. If the landing page contains blank or redacted content at this time, the landing page may be populated with the shared messages at a later time (e.g., after share approval is obtained from the second user terminal). Thus, in such case, the third user terminal may not be permitted to access the messages on the landing page until the authorization for the sharing is given by the second user terminal.

Once the share message screen is generated, the server 200 may transmit a notification message, which is linked to the share message screen, to the third user terminal apparatus 100-3 (S1935). The server 200 may transmit a share approval request to the second user terminal 100-2 that originally uploaded the selected messages to request an approval of sharing the selected messages with the third user terminal 100-3 (S1940).

If the second user terminal 100-2 that received the share approval request approves the share approval request (S1945), the second user terminal 100-2 may transmit a control signal corresponding to approval of the share approval request to the third user terminal 100-3 (S1950). If the third user terminal apparatus 100-3 receives the control signal, the shared messages may be accessed through the share message screen (S1955). Alternatively, the control signal corresponding to the approval of the share approval request may be sent from the second user terminal 100-2 to the server 200. Upon receiving the control signal, the server 200 may then grant access to the third user terminal 100-3 to access the shared messages. At this time, the server 200 may also populate the landing page with the shared messages if the landing page contained only blank or redacted content prior to the second user terminal 100-2 approving the message share. On the other hand, if the second user terminal 100-2 rejects the share approval request, then the server 200 may populate the landing page with redacted versions of the plurality of shared messages in a manner similar to what is shown in FIG. 8C.

As described above, according to various exemplary embodiments, a message transmitted and received with another user terminal apparatus may be more conveniently and safely shared with a third party.

A process of sharing messages that a user terminal apparatus exchanges with another user terminal apparatus with a third party is described above. However, the user may share messages that are exchanged with another electronic apparatus with a third user terminal apparatus or another electronic apparatus. Also, another electronic apparatus may share messages that are exchanged between a user terminal apparatus with another electronic apparatus to a third user terminal apparatus or another electronic apparatus.

The another electronic apparatus may, for example, be include an artificial intelligence (AI) and include a server apparatus capable of recognizing and expressing natural language, a smartphone, a printer, a refrigerator, a wearable device, and etc.

The artificial intelligence may, for example, refer to a software technology which learns from big data, accumulates knowledge, communicates with a user, shares information and knowledge through voluntary collaboration as necessary, and is evolvable.

The artificial intelligence capable of processing big data may support a professional-level problem solving and decision making through analysis/inference of common knowledge and professional language and in-depth study. Also, the artificial intelligence may have a knowledge reproduction capability which establishes a basis of knowledge capable of communicating, self-studying, and domain expanding with knowledge and intelligence system of human level. Also, the artificial intelligence may itself solve a new problem through collaboration intelligence realized based on a different kind of knowledge mounted on and distributed to various devices and voluntary collaboration between the devices.

Hereinafter, an exemplary embodiment of transmitting a conversation between a user terminal apparatus and another electronic apparatus to a third user terminal apparatus will be described.

FIGS. 20(A) through 20(F) are views illustrating a process of transmitting a plurality of messages between a user terminal apparatus 100 and an artificial intelligence server apparatus to another user terminal apparatus, according to an exemplary embodiment.

FIG. 20(A) illustrates a display (120) which displays a screen of a dialogue of a messenger application executed in a user terminal apparatus 100, according to an exemplary embodiment of the present disclosure. As illustrated in FIG. 20(A), user A may request scheduling with B to an artificial intelligence server apparatus (hereinafter, "secretary A 2010") of A. The secretary A 2010 may recognize the scheduling request with B received in the form of message using a natural language recognition program.

FIG. 20(B) illustrates a screen which displays content that the secretary A 2010 at the terminal apparatus 100 of the user A checks schedule from an artificial intelligence server apparatus (hereinafter, referred to as "secretary B 2040") of B and informs the user A of the schedule, according to an exemplary embodiment of the present disclosure.

According to various exemplary embodiments, the secretary A 2010 and the secretary B 2040 may cooperate to check the schedule of B, and the terminal apparatus 100 of the user A may display content of the available time to schedule appointment with the user A. For example, the terminal apparatus 100 of the user A may display a message and/or a check box requesting confirmation of the user A according to the schedule received from the secretary A.

FIG. 20(C) illustrates a screen where the user A approves schedule checked by the secretary A 2010. As illustrated in FIG. 20(C), the user A may select the checkbox (2020) to approve schedule confirmed by the secretary A 2010, and select OK 2030 to confirm the schedule.

FIG. 20(D) illustrates a screen where the secretary B 2040 requests approval regarding schedule discussed with the secretary A 2010 from the user B, according to an exemplary embodiment of the present disclosure. As illustrated in FIG. 20(D), the terminal apparatus may display schedule with the user A which has been checked by collaboration between the secretary B 2040 and the secretary A 2010. Also, the terminal apparatus of the user B may display a checkbox 2050 to confirm whether the user B would approve schedule which has been prepared by collaboration between the secretary B 2040 and the secretary A 2010.

FIG. 20(E) illustrates a screen that the user B approves schedule checked by the secretary B 2040, according to an exemplary embodiment of the present disclosure. As illustrated in FIG. 20(E), the user B may select the checkbox 2050 to approve schedule checked by the secretary B 2040, and confirm the schedule by selecting OK 2060.

According to the various exemplary embodiments of the present disclosure, when the user B's approval has been confirmed in FIG. 20(E), the secretary A 2010 may, as a non-limiting example, transmit a message as in FIG. 20(B) to the user A. For example, the secretary A 2010 and the secretary B 2040 may respectively perform an operation of receiving approval with respect to schedule from each of the users.

FIG. 20(F) illustrates a screen that another user terminal apparatus receives a notification message 2070 informing a user of reservation, according to an exemplary embodiment of the present disclosure. As illustrated in FIG. 20(F), the secretary A 2010 may, when confirming approval from the user A and the user B, transmit a message requesting reservation at a predetermined place. For example, the notification message 2070 transmitted from the secretary A 2010 may include an URL link 2071 of an instant page including shared messages.

When a user who receives the notification message 2070 selects the URL link 2071, an instant page generated and stored in the server 200 may be displayed. In this example, the shared content may, as a non-limiting example, be making a reservation for C restaurant based on the schedule approved by the user A and the user B.

FIGS. 21(A) through 21(E) are views illustrating a process of transmitting a plurality of messages between a user terminal apparatus and a healthcare wearable device to another user terminal apparatus, according to an exemplary embodiment of the present disclosure.

FIG. 21(A) illustrates a display 120 which displays a dialogue screen of a messenger application executed in an user terminal apparatus 100, according to an exemplary embodiment of the present disclosure. As illustrated in FIG. 21(A), a healthcare wearable device (hereinafter, "a health device 2110") may inform the user A of measured body data 2120. The measured body data 2120 may, as non-limiting examples, be a heart rate, blood sugar, number of steps per day and calories consumed per day of the user A. However, the body data is not limited thereto, and may be of variety of types according to a type of the health device 2110.

The terminal apparatus 100 of the user A may sequentially display a plurality of messages received from the health device 2110. In this example, the messages may, as non-limiting examples, be various contents including text, images, photos, and etc.

The health device 2110 may transmit all the measured body data 2120 to another user terminal apparatus (for example, a terminal apparatus at a data reception of a hospital), or transmit values that exceed a predetermined range from among the measured body data 2120 to another user terminal apparatus. The health device 2110 may proceed with the step of receiving approval of a user before transmitting the body data to another user terminal apparatus.

FIG. 21(B) may be a screen that the health device 2110 requests for approval before transmitting the body data 2120 to another user terminal apparatus. As illustrated in FIG. 21(B), the health device 2110 may request approval from the user A as to transmitting a heart rate 2121, blood sugar 2122 and calories 2123 to a B hospital 2124.

FIG. 21(C) illustrates a screen where items approved of transmission by the user A are selected. As illustrated in FIG. 21(C), the user A may select items 2130 to approve of actual data transmission, approves 2132 them, and confirms 2140 them and transmits the measured body data to another user terminal apparatus. However, according to various exemplary embodiments, when a manager does not want to approve the data transmission, the manager may select reject 2134 in the checkbox.

According to various exemplary embodiments, when the user approves data transmission, the items approved by the user A may be transmitted to another user terminal apparatus.

FIG. 21(D) illustrates a screen that another user terminal apparatus receives a notification message 2150 informing that there is measured body data, according to an exemplary embodiment of the present disclosure. For example, the notification message 2150 transmitted from the health device 2110 may include a URL link 2151 of an instant page including shared messages. When a user who receives the notification message 2150 selects the URL link 2151, an instant page 2160 generated and stored in the server 200 maybe displayed.

According to various exemplary embodiments, the processes described in FIGS. 21(A) through 21(B) may be performed in a terminal apparatus of a guardian who can represent the user A. For example, when the user A is a minor or needs a guardian, data measured by the health device 2110 of the user A may be transmitted to the terminal apparatus 100 of the user A and a terminal apparatus of the guardian of the user A. In this example, the guardian of the user A may proceed with the above-described approval process with respect to transmitting the measured data to another user terminal apparatus (for example, a terminal apparatus at a data reception of a hospital) using his or her own terminal apparatus.

According to another exemplary embodiment, without going through the above-described processes of FIGS. 21(A) through 21(C), the health device 2110 may immediately transmit the measured body data 2120 to another user terminal apparatus. For example, when the measured body data 2120 is off of a reference range by a predetermined value, the health device may recognize that the user A is in emergency, and transmit the measured body data 2120 to another user terminal apparatus and inform it of the emergency. However, in this example as well, the health device 2110 may inform the user or the guardian of the user of the measured body data.

Further, the method performed by the user terminal apparatus 100 according to the above-described various exemplary embodiments may be implemented in software programs or instructions stored in various computer-readable storage media. That is, a computer program or a set of instructions, stored in a computer-readable storage medium or device, may be executed by a processor to perform the method according to the above-described various exemplary embodiments.

As an example, a non-transitory computer-readable storage medium having stored thereon a computer program, which performs operations of displaying a message screen including a message received from a server and a message transmitted to the server, if a share menu is selected on the message screen, displaying the messages on the message screen in an individually selectable status, if each of the plurality of messages is selected on the message screen, and at least one share target that is to share the messages is selected, and informing the server of the selected message and the share target may be provided.

The non-transitory computer readable medium refers to a medium where data can be stored semi-permanently and is readable by a device, and not a medium which stores data for a short period of time such as a register, cache, and memory etc. More specifically, the aforementioned various applications or programs may be stored in and provided by non-transitory computer readable medium such as a compact disc (CD), a digital versatile disc (DVD), a hard disk, a solid-state drive (SSD), a Blu-ray disc, a Universal Serial Bus (USB) memory, a flash memory, a memory card, and ROM, etc.

While exemplary embodiments have been particularly shown and described, it will be understood by those skilled in the art that various changes in form and details may be made therein without departing from the spirit and scope of the inventive concept as defined by the appended claims. Therefore, the scope of the inventive concept is defined not by the detailed description of the disclosure but by the appended claims, and all differences within the scope will be construed as being included in the present disclosure.

What is claimed is:

1. A first user terminal comprising:
   a communication interface;
   a display configured to display a screen including a plurality of messages received from a second user terminal via a server; and
   a processor configured to:
   control the display to display the plurality of messages, which have been previously exchanged, through the communication interface, between the first user terminal and the second user terminal via the server, on the screen, and
   based on at least one message of the plurality of messages being selected on the screen and at least one third user terminal, with which to share the selected at least one message of the plurality of messages, being selected, control the communication interface to transmit, to the server, information regarding the selected at least one message of the plurality of messages and the at least one third user terminal.

2. The first user terminal as claimed in claim 1, wherein the processor is further configured to:
   control the display to display a menu window for selecting a share option, the menu window including a first option for manually selecting the plurality of messages, and
   based on the first option being selected on the menu window, control the display to display the plurality of messages on the screen in an individual selection mode, in which each of the plurality of messages are selectable by a user for sharing with the at least one third user terminal.

3. The first user terminal as claimed in claim 2, wherein the menu window further includes a second option for selecting a group of messages, and
   wherein the processor is further configured to, based on the second option being selected on the menu window, control the display to display the plurality of messages on the screen in a group selection mode, in which each of the plurality of messages are selectable by the user for sharing with the at least one third user terminal and if two messages are selected by the user, intervening messages between the two messages selected by the user are automatically selected for sharing with the at least one third user terminal.

4. The first user terminal as claimed in claim 2, wherein the menu window further includes a third option for selecting the at least one third user terminal, and
wherein the processor is further configured to:
based on the third option being selected on the menu window, control the display to display a list of previously stored user terminals, and
based on at least one user terminal of the previously stored user terminals being selected from the list, designate the selected at least one user terminal as the at least one third user terminal.

5. The first user terminal as claimed in claim 1, wherein the processor is further configured to control the display to display a menu window for selecting a share option, and
wherein the share option includes at least one of a first option for manually selecting a message, a second option for selecting a group of messages, a third option for selecting the at least one third user terminal, a fourth option for providing a uniform resource locator (URL) of a landing page including a shared message, a fifth option for setting a share time limit of the shared message, and a sixth option for setting an access count limit for the shared message, the access count limit indicating a number of times that the at least one third user terminal is permitted to access the shared message.

6. The first user terminal as claimed in claim 1, wherein the processor is further configured to:
based on a notification message with respect to a second plurality of messages selected by the second user terminal being received via the communication interface, control the display to display the notification message; and
based on the notification message being activated by a user, control the display to display a share message screen linked to the notification message,
wherein the share message screen includes the second plurality of messages selected by the second user terminal.

7. The first user terminal as claimed in claim 1, wherein the processor is further configured to:
based on a share approval request being received from the server, control the display to display a share approval screen corresponding to the share approval request, the share approval screen including a selection menu for selecting whether to approve or reject the share approval request; and
control the communication interface to transmit, to the server, a control signal corresponding to a selection by a user with respect to the share approval screen.

8. The first user terminal as claimed in claim 1, wherein the screen is a chatroom of a messaging application being executed on the first user terminal,
wherein the chatroom sequentially displays the plurality of messages that are input by a plurality of user terminals participating in the chatroom, and
wherein, based on at least one of the plurality of messages displayed on the chatroom being selected for sharing, the communication interface transmits a share approval request to the plurality of user terminals participating in the chatroom.

9. A server comprising:
a communication interface configured to communicate with a plurality of user terminals; and
a processor configured to:
based on the communication interface receiving, from a first user terminal, a share request with respect to a plurality of messages originating from a second user terminal, generate a share message screen that combines the plurality of messages, which have been previously exchanged between the first user terminal and the second user terminal through the server,
generate a notification message including a link to the share message screen, and
control the communication interface to transmit the notification message to a third user terminal designated by the share request as a share target.

10. The server as claimed in claim 9, wherein the processor is further configured to control the communication interface to transmit, to the second user terminal, a share approval request with respect to the plurality of messages, wherein the server allows the first user terminal to share the plurality of messages with the third user terminal only if the second user terminal accepts the share approval request.

11. A method performed by a first user terminal apparatus, the method comprising:
displaying, by a first user terminal, a screen including a plurality of messages received from a second user terminal via a server;
displaying the plurality of messages, which have been previously exchanged between the first user terminal and the second user terminal through the server, on the screen in an individually selectable manner; and
based on at least one message of the plurality of messages being selected on the screen and a third user terminal, with which to share the selected at least one message of the of messages, being selected, transmitting, to the server, information regarding the selected at least one message of the plurality of messages and the third user terminal.

12. The method as claimed in claim 11, further comprising:
displaying a menu window for selecting a share option, the menu window including a first option for manually selecting the plurality of messages; and
based on the first option being selected on the menu window, displaying the plurality of messages on the screen in an individual selection mode, in which each of the plurality of messages are selectable by a user for sharing with the third user terminal.

13. The method as claimed in claim 12, wherein the menu window further includes a second option for selecting a group of messages, and
wherein the method further comprises:
based on the second option being selected on the menu window, displaying the plurality of messages on the screen in a group selection mode, in which each of the plurality of messages are selectable by the user for sharing with the third user terminal and if two messages are selected by the user, intervening messages between the two messages selected by the user are automatically selected for sharing with the third user terminal.

14. The method as claimed in claim 12, wherein the menu window further includes a third option for selecting the third user terminal, and
the method further comprises:
based on the third option being selected on the menu window, displaying a list of previously stored user terminals; and based on at least one user terminal of the previously stored user terminals being selected from the list, designating the selected at least one user terminal as the third user terminal.

15. The method as claimed in claim 11, further comprising displaying a menu window for selecting a share option,
   wherein the share option includes at least one of a first option for manually selecting a message, a second option for selecting a group of messages, a third option for selecting the third user terminal, a fourth option for providing a uniform resource locator (URL) of a landing page including a shared message, a fifth option for setting a share time limit of the shared message, and a sixth option for setting an access count limit for the shared message, the access count limit indicating a number of times that the third user terminal is permitted to access the shared message.

16. The method as claimed in claim 11, further comprising:
   based on a notification message with respect to a second plurality of messages selected by the second user terminal being received, displaying the notification message; and
   based on the notification message being activated by a user, displaying a share message screen linked to the notification message,
   wherein the share message screen includes the second plurality of messages selected by the second user terminal.

17. The method as claimed in claim 11, further comprising:
   based on a share approval request being received from the server, displaying a share approval screen corresponding to the share approval request, the share approval screen including a selection menu for selecting whether to approve or reject the share approval request; and
   transmitting, to the server, a control signal corresponding to a selection by a user with respect to the share approval screen.

18. The method as claimed in claim 11, wherein the screen is a chatroom of a messaging application being executed on the first user terminal,
   wherein the chatroom sequentially displays the plurality of messages that are input by a plurality of user terminals participating in the chatroom, and
   wherein the transmitting the information to the server comprises, based on at least one of the plurality of messages displayed on the chatroom being selected for sharing, transmitting a share approval request to the plurality of user terminals participating in the chatroom.

* * * * *